(12) United States Patent
Avasarala et al.

(10) Patent No.: US 11,136,879 B2
(45) Date of Patent: *Oct. 5, 2021

(54) BORESCOPE FOR DRILLED SHAFT INSPECTION

(71) Applicant: Aver Technologies, Inc., Woodbridge, VA (US)

(72) Inventors: Swamy Kumar V. Avasarala, Woodbridge, VA (US); Pranav Avasarala, Woodbridge, VA (US); Pallavi Avasarala, Woodbridge, VA (US); Sohan Kumar Sunku, Woodbridge, VA (US); Sahiti Rachakonda, Woodbridge, VA (US)

(73) Assignee: Aver Technologies, Inc., Woodbridge, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,349

(22) Filed: Apr. 29, 2020

(65) Prior Publication Data

US 2021/0238975 A1      Aug. 5, 2021

Related U.S. Application Data

(63) Continuation of application No. 16/778,732, filed on Jan. 31, 2020, now Pat. No. 10,677,039.

(51) Int. Cl.
*G01N 21/954*     (2006.01)
*E21B 47/002*    (2012.01)
(Continued)

(52) U.S. Cl.
CPC .............. *E21B 47/002* (2020.05); *E02D 1/02* (2013.01); *H04N 5/2252* (2013.01); *H04N 5/23241* (2013.01); *H04N 2005/2255* (2013.01)

(58) Field of Classification Search
CPC . G06T 7/85; G06T 17/00; G06T 2207/10028; G06T 2200/08; G06K 9/6201; G06K 9/46; H04N 13/246
See application file for complete search history.

(56) References Cited

U.S. PATENT DOCUMENTS 3,960,448 A * 6/1976 Schmidt .................. E02D 1/022
                                                                    356/32
4,079,625 A   3/1978 Mann
(Continued)

FOREIGN PATENT DOCUMENTS

DE        202 13 658 U1     2/2003
EP           1762864 A1     3/2007
(Continued)

OTHER PUBLICATIONS

GPE, Inc., Product Bulletin, Miniature Drilled Inspection Device (Mini-sid), available at https://web.archive.org/web/20160603170031/ http://www.gpe.org/products/miniSID.htm, Jun. 3, 2016, 2 pages.
(Continued)

*Primary Examiner* — Howard D Brown, Jr.
(74) *Attorney, Agent, or Firm* — Bookoff McAndrews, PLLC

(57) ABSTRACT

A borescope may include a housing including a transparent viewing window, a bumper surrounding at least a portion of a periphery of the transparent viewing window, wherein the bumper is configured to be pressurized by a fluid, and at least one imaging assembly configured to visualize a field of view exterior of the housing through the transparent viewing window.

20 Claims, 14 Drawing Sheets

(51) Int. Cl.
  *E02D 1/02* (2006.01)
  *H04N 5/232* (2006.01)
  *H04N 5/225* (2006.01)

(56) References Cited

U.S. PATENT DOCUMENTS

| | | | |
|---|---|---|---|
| 4,347,743 | A | 9/1982 | Rausche et al. |
| 4,938,060 | A | 7/1990 | Sizer et al. |
| 5,123,492 | A | 6/1992 | Lizanic, Jr. |
| 5,255,245 | A | 10/1993 | Clot |
| 5,275,038 | A | 1/1994 | Sizer et al. |
| 5,355,128 | A | 10/1994 | Riordan |
| 5,355,715 | A | 10/1994 | Rausche et al. |
| 5,379,216 | A | 1/1995 | Head |
| 5,419,188 | A | 5/1995 | Rademaker et al. |
| 5,485,745 | A | 1/1996 | Rademaker et al. |
| 5,550,331 | A | 8/1996 | Thompson |
| 5,587,525 | A | 12/1996 | Shwe et al. |
| 5,652,617 | A | 7/1997 | Barbour |
| 5,663,559 | A | 9/1997 | Auzerais et al. |
| 5,717,455 | A | 2/1998 | Kamewada |
| 5,754,220 | A | 5/1998 | Smalser, Sr. |
| 5,771,984 | A | 6/1998 | Potter et al. |
| 5,969,241 | A | 10/1999 | Auzerais |
| 5,978,749 | A | 11/1999 | Likins, Jr. et al. |
| 5,996,711 | A | 12/1999 | Ohmer |
| 6,041,860 | A | 3/2000 | Nazzal et al. |
| 6,145,247 | A | 11/2000 | McKinnis |
| 6,157,893 | A | 12/2000 | Berger et al. |
| 6,164,126 | A | 12/2000 | Ciglenec et al. |
| 6,229,453 | B1 | 5/2001 | Gardner et al. |
| 6,275,645 | B1 | 8/2001 | Vereecken et al. |
| 6,281,489 | B1 | 8/2001 | Tubel et al. |
| 6,301,551 | B1 | 10/2001 | Piscalko et al. |
| 6,307,199 | B1 | 10/2001 | Edwards et al. |
| 7,002,620 | B1 | 2/2006 | Rutledge |
| 7,187,784 | B2 | 3/2007 | Tawfiq et al. |
| 7,356,236 | B1 * | 4/2008 | Huang ............... G02B 6/3807 |
| | | | 385/134 |
| 8,022,983 | B2 | 9/2011 | Clark et al. |
| 8,151,658 | B1 | 4/2012 | Ding |
| 8,161,823 | B2 | 4/2012 | Berris, Jr. |
| 8,169,477 | B2 | 5/2012 | Tawfiq et al. |
| 9,285,206 | B1 | 3/2016 | Berris, Jr. |
| 10,330,823 | B2 | 6/2019 | Piscsalko et al. |
| 10,466,400 | B2 * | 11/2019 | Galarza ............... G02B 6/4476 |
| 10,677,039 | B1 * | 6/2020 | Avasarala ............ E21B 47/002 |
| 2004/0160514 | A1 | 8/2004 | Tawfig et al. |
| 2007/0055103 | A1 | 3/2007 | Hoefig et al. |
| 2009/0218097 | A1 | 9/2009 | Cook |
| 2009/0251993 | A1 | 10/2009 | Berris, Jr. et al. |
| 2009/0284758 | A1 | 11/2009 | Kuwata |
| 2010/0020163 | A1 | 1/2010 | Watanabe et al. |
| 2010/0240952 | A1 | 9/2010 | Okazaki et al. |
| 2011/0233889 | A1 | 9/2011 | Watson |
| 2012/0026306 | A1 | 2/2012 | Mitra et al. |
| 2012/0113209 | A1 * | 5/2012 | Ritchey ............. G02B 27/0179 |
| | | | 348/14.02 |
| 2012/0143004 | A1 | 6/2012 | Gupta et al. |
| 2013/0086974 | A1 | 4/2013 | Rausche |
| 2014/0182373 | A1 | 7/2014 | Sbihli et al. |
| 2014/0185648 | A1 | 7/2014 | Piscsalko et al. |
| 2014/0268541 | A1 | 9/2014 | Coombs et al. |
| 2015/0029500 | A1 | 1/2015 | Ward et al. |
| 2015/0233230 | A1 | 8/2015 | Likins, Jr. et al. |
| 2016/0095500 | A1 | 4/2016 | Kumagai et al. |
| 2016/0245178 | A1 | 8/2016 | Bhabhrawala |
| 2016/0348500 | A1 | 12/2016 | Piscsalko et al. |
| 2019/0120041 | A1 | 4/2019 | Avasarala et al. |
| 2019/0271796 | A1 | 9/2019 | Piscsalko et al. |
| 2019/0331612 | A1 * | 10/2019 | Morris ................ G01N 21/954 |
| 2019/0331613 | A1 * | 10/2019 | Morris ................ G01N 21/954 |

FOREIGN PATENT DOCUMENTS

| | | |
|---|---|---|
| JP | 3120951 B2 | 10/2000 |
| WO | 2011159659 A1 | 12/2011 |
| WO | 2012109192 A2 | 8/2012 |
| WO | 2016178684 A1 | 11/2016 |
| WO | 2018157015 A1 | 8/2018 |

OTHER PUBLICATIONS

Extended European Search Report dated Feb. 1, 2021 in European Application No. 20187142.3 (8 pages).

International Search Report and Written Opinion issued in International Application No. PCT/US2021/015847, dated Jun. 23, 2021 (12 pages).

* cited by examiner

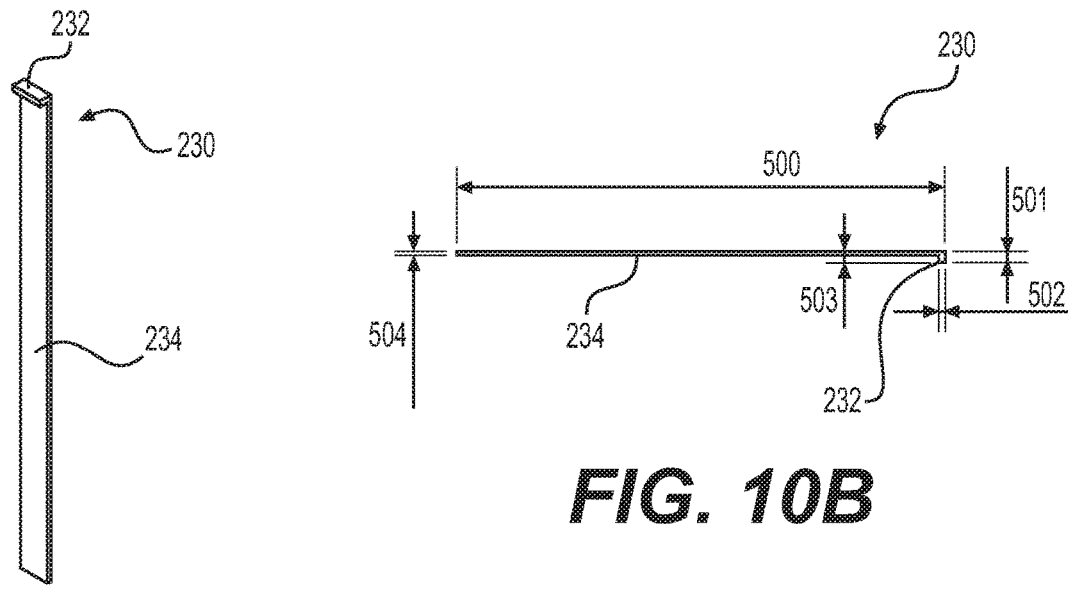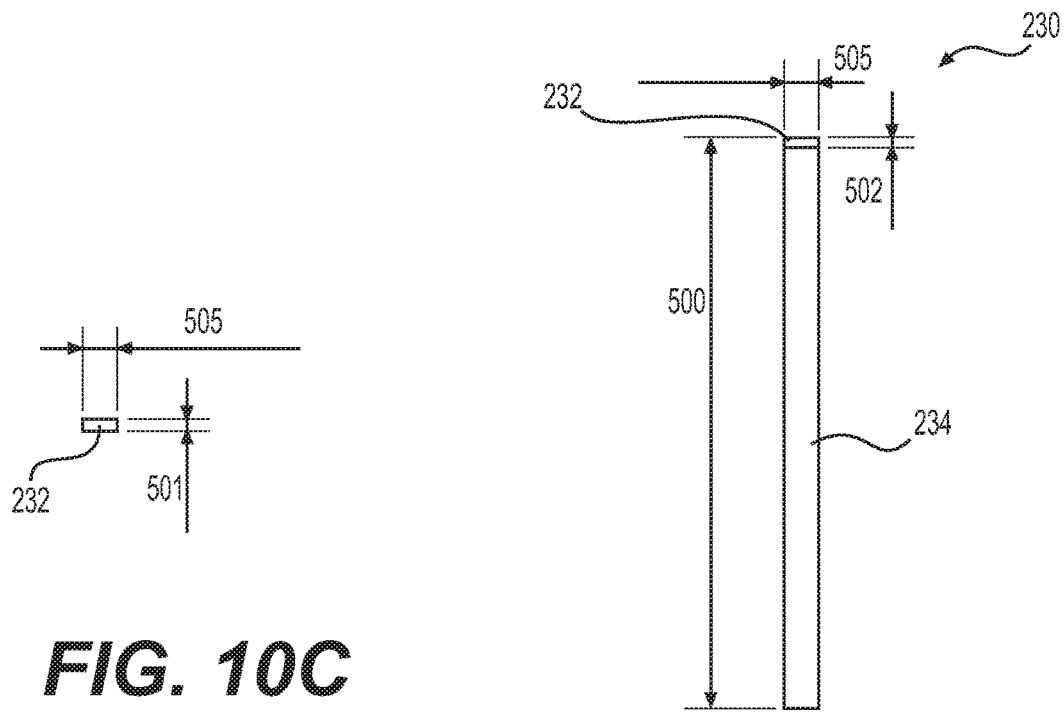
FIG. 10A
FIG. 10B
FIG. 10C
FIG. 10D

BORESCOPE FOR DRILLED SHAFT INSPECTION

CROSS-REFERENCE TO RELATED APPLICATION

This application is a continuation of U.S. patent application Ser. No. 16/778,732, filed Jan. 31, 2020, which is incorporated by reference herein in its entirety.

TECHNICAL FIELD

The disclosure relates generally to a borescope system for use in inspecting and profiling drilled shafts, also referred to as bores or boreholes. In particular, the disclosure relates to a portable system for inspecting and profiling relatively large drilled construction shafts that may improve inspection efficiency in terms of maneuverability, information gathering, data recording, data analyzing, and data qualifying.

INTRODUCTION

Drilled construction shafts that are subsequently filled with concrete or similar materials provide support for many large building and infrastructure projects. For this reason, field engineers, and inspectors involved in preparing such shafts are particularly concerned with ensuring that the load transfers in side resistance and in end bearing are consistent with any assumptions made during the design phase.

Normally, project design methods assume that drilled shafts are constructed under competent supervision with ample quality control and the finished foundation will be durable and have structural integrity. However, such assumptions are not always warranted. For example, the foundation boreholes constructed are roughly cylindrical in shape. However, the theoretical volume of bore is not same as the actual volume of the bore due to reasons such as hole size being greater than the bit used to create the hole, caving on the side of the bore, etc. Unless project specifications and procedures are closely followed in the field, for example, the final shaft may have defects that can influence its structural and bearing capacity when filled. Therefore, the inspection and profiling of the drilled shafts and the record keeping associated with the shaft construction are important and require careful attention.

Defects of a finished support structure and the conditions under which such defects occur may involve a number of causes. For example, defects typically result from one or more of the following: 1) over-stressing the soil beneath the shaft base due to insufficient bearing (contact) area or because of unconsolidated materials located at the shaft base; 2) excessive mixing from mineral slurry, which can affect the development of concrete strength and/or formation of voids and cavities within the set concrete; and 3) structural discontinuities and/or deviations from the true vertical line causing local, undesirable stress concentrations. In general, these and other defects can result in insufficient load transfer reducing the bearing capacity of the final structure and/or causing excessive settling during service.

To develop the required end bearing capacity, the drilled shaft should be inspected so that undesirable debris may be removed prior to concrete placement. Shaft failures have been attributed to insufficient borehole cleaning, and cleaning the base of boreholes often requires special tools. Although the operation sounds simple, a typical cleaning process involves several steps, including visually inspecting the borehole, sounding the base of the shaft by a weight attached to a chain, and obtaining samples of the side walls and the base. Based on the results of the visual, sounding, and sampling inspections, a trained inspector determines whether the borehole must be cleaned or otherwise altered before concrete placement. The inspector usually bases his or her decision on the condition of the borehole and the amount of sedimentary deposits at the base. If the inspector determines that cleaning is warranted, several methods may be used, including air lifting, using a clean-out-bucket, or removing debris and unwanted material with a submerged pump.

SUMMARY

In one aspect, the disclosure is directed to a borescope, comprising a housing including a transparent viewing window, a bumper surrounding at least a portion of a periphery of the transparent viewing window, wherein the bumper is configured to be pressurized by a fluid; and at least one imaging assembly configured to visualize a field of view exterior of the housing through the transparent viewing window.

The borescope may include an extendable and retractable support assembly coupled to the housing on a side opposite of the transparent viewing window. The support assembly includes telescoping rod sections that are movable relative to one another, to adjust a length of the support assembly. The borescope may include a linear actuator configured to move the telescoping rod sections relative to one another. The borescope may include a sensor coupled to the support assembly, wherein the sensor is configured to measure a current directed to the support assembly, and a controller coupled to the sensor and the support assembly, wherein the controller is configured to increase a length of the support assembly until the controller receives an indication of a spike in current from the current sensor. The controller is configured to stop a flow of current to the support assembly upon receiving the indication of the spike. The spike occurs when a load on the support assembly reaches a threshold that is greater than 80% of the load rating of the support assembly. The support assembly includes a linear piston. The bumper is a circular tubing. The bumper is a tubing, and the tubing is configured to press against a surface to form a seal between the surface and the window. The housing further includes a support section, the bumper is coupled to the support section, and the support section includes at least one inlet configured to convey fluid toward an exterior of the window. The support section includes at least one outlet configured to convey fluid away from the exterior of the window. The support section includes a valve configured through which fluid can be conveyed into the bumper. The housing further includes a light source configured to illuminate an area being viewed by the imaging assembly. The at least one imaging assembly is configured to rotate about a longitudinal axis of the housing, and also pivot relative to the longitudinal axis of the housing.

In another aspect, the disclosure is directed to a borescope, comprising a housing extending from a first end toward a second end; an imaging assembly configured to visualize a field of view exterior of the housing; and a plurality of strips extending away from the housing and surrounding the imaging assembly, wherein each of the plurality of strips is coupled to the housing and movable relative to the housing in a longitudinal direction of the housing.

The plurality of strips includes a first plurality of strips arranged radially around the imaging assembly, and a second plurality of strips arranged radially around the first plurality of strips. The borescope may include a support assembly comprising a flange having a plurality of slots disposed through the flange, wherein each of the plurality of strips is received by one of the slots. Each of the plurality of strips includes a flange configured to abut the flange of the support assembly, wherein each flange of the plurality of strips is disposed between the housing and the flange of the support assembly. Each of the plurality of strips is movable independently of all other of the plurality of strips.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 10A is a perspective view of a strip from the measurement assembly of FIG. 8A.

FIG. 10B is a side view of the strip of FIG. 10A.

FIG. 10C is a top view of the strip of FIG. 10A.

FIG. 10D is a front view of the strip of FIG. 10A.

DETAILED DESCRIPTION

Reference will now be made in detail to aspects of the present disclosure, examples of which are illustrated in the accompanying drawings. Wherever possible, the same or similar reference numbers will be used through the drawings to refer to the same or like parts.

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value or characteristic.

Embodiments of the disclosure provide, among other things, a system for accurately inspecting and profiling relatively large construction boreholes such as those prepared for building and various infrastructure drilled shaft foundations. The disclosure may help provide an accurate visual inspection and volume profile of the sides and/or the bottom of boreholes to construct deep foundations or slurry walls. Embodiments of the disclosure may determine a volume of a borehole, the quality of rock surrounding a borehole, as well as the physical and electrical properties, such as, the pressure and the temperature of the slurry in the borehole. This may be accomplished by portable systems utilizing a camera and/or ultrasonic sensors in an assembly made watertight, despite uneven surfaces typically found on the side or bottom of boreholes. The systems of the present disclosure may provide a device, for inspection of a fully-drilled borehole, that a single user can operate.

In one embodiment, an inspection system of the disclosure collects data in analog and/or digital form and is capable of providing digital information to a computing device using a cable. In yet another embodiment, the camera and ultrasonic sensors are controlled wirelessly from a computing device. Thus, it is economical and convenient in terms of the number of required personnel and efficient in storing and retrieving the needed information.

The present disclosure may be particularly well-suited for inspection in waterways projects and may provide clear vision in environments where visibility is otherwise limited. Moreover, the features of the present disclosure described herein may be less laborious and easier to implement than currently available techniques, as well as being economically feasible and commercially practical.

Figure 1:
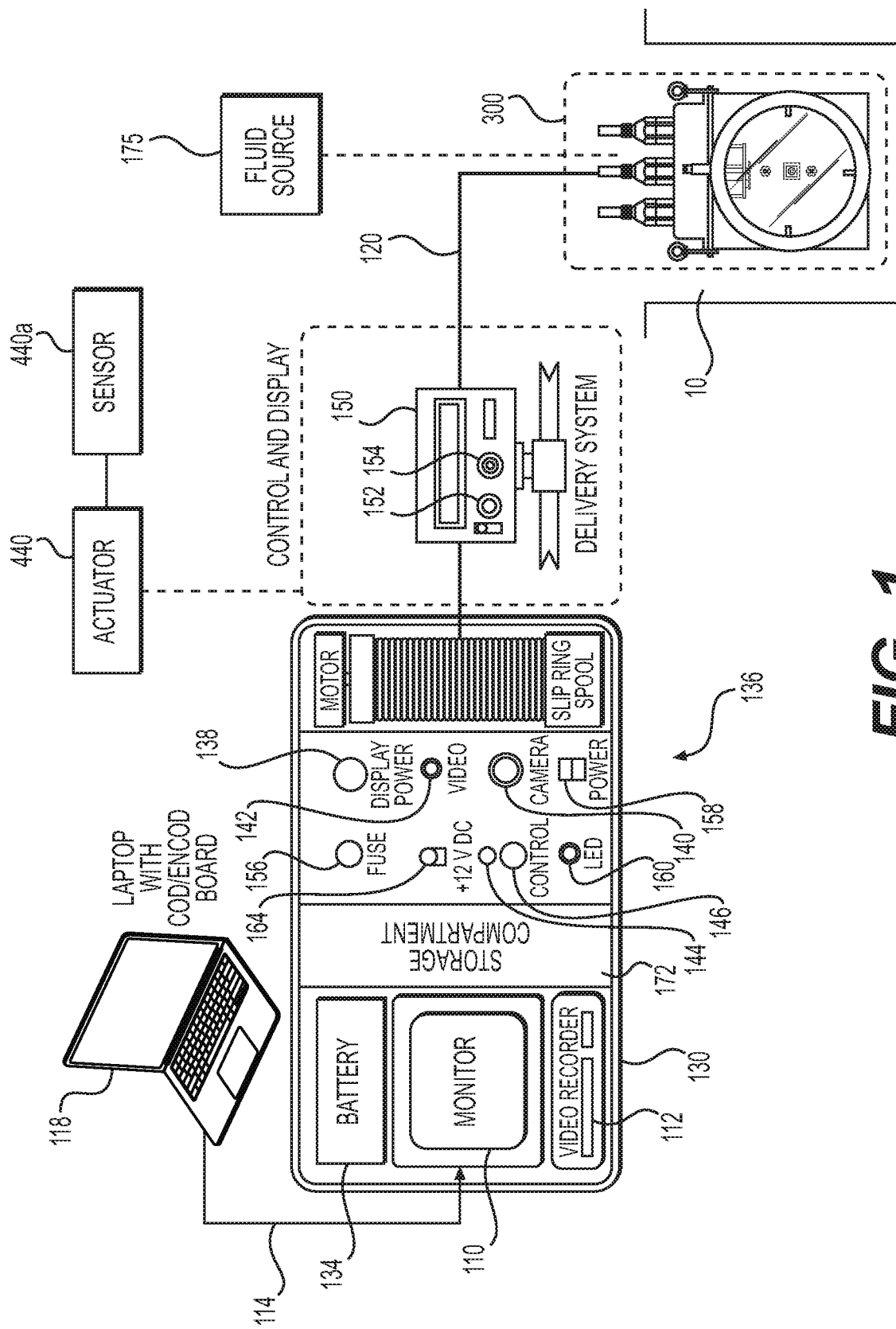
FIG. 1 is a schematic illustration of a borescope system for visually inspecting and profiling the sides of drilled shafts according to an embodiment of the disclosure.

Referring now to the drawings, FIG. 1 illustrates a borescope system visually inspecting and profiling the sides of drilled shafts in block diagram form. As shown, the system includes a viewing assembly 300 connected to a display 110 (e.g., a relatively small, portable video display, television, computer, tablet, phone, smart glasses, or the like) for visually inspecting a borehole. A typical borehole is several feet in diameter (e.g., about nine feet) and has an even greater depth (e.g., about 150 feet). It is to be understood, however, that a borehole describes any opening in the ground that has either a generally cylindrical geometry of a few inches to several feet in diameter and depth or a generally rectangular cutoff wall in the ground with a few inches to several feet in width/depth. Drillers may sink a borehole using a drilling rig or a hand-operated rig. The machinery and techniques to advance a borehole vary considerably according to manufacturer, geological conditions, and the intended purpose. The borehole can be dry or wet (at least partially filled with transparent, translucent, or opaque fluid). The borehole can be self-supported, cased, or a pipe pile. The ratio of the size of the borehole to the viewing assembly 300 can be about 1:1 (so long as the housing fits within the borehole), about 2:1, about 3:1, or any other suitable ratio.

As described in detail below, the present system may be used to visually inspect boreholes used to construct deep foundations or slurry walls using at least one camera. According to embodiments of the disclosure, viewing assembly 300 generates images and measurements of the interior surfaces of the borehole, specifically, the side walls of the borehole, while suspended therein. In one embodiment, the borescope system provides a line 114 to a computer 118 for displaying and recording the captured images and measurements. In the embodiment shown, viewing assembly 300 communicates with the computer 118 via a power-control cable 120 (also referred to as an umbilical cord). Viewing assembly 300 communicates with computer 118 according to, for example, an RS232 standard, although any other suitable mechanism also is contemplated. It is to be understood that computer 118 may be used in addition to or instead of the display 110 and video recorder 112 for recording the video images of the interior of the borehole generated by viewing assembly 300.

The borescope system of the disclosure also includes a case 130 for housing, storing, and transporting various components of the system. The case 130 houses a rechargeable, and/or otherwise replaceable, battery 134 for supplying power to the various components of the system. In some embodiments, duplicate power and battery systems may be incorporated. An appropriately wired connector panel 136 may provide electrical connections between the various components such as the battery 134, viewing assembly 300, display 110, and/or computer 118.

Although computer 118 is shown as a laptop computer in FIG. 1, other computer configurations are easily adapted for use with the present disclosure, including, for example, tablets (e.g., construction- or military-grade tablets), smart phones, smart glasses, and the like. Moreover, computer 118 may be self-powered (e.g., independently battery powered), receive power from battery 134, or receive power from an external source independent of the borescope system.

In the illustrated embodiment, battery 134 supplies power to display 110 and recorder 112 via a display power connection 138 and a power line (not shown). Battery 134 also supplies power to viewing assembly 300 via a camera input 140, an ultrasonic sensor input 144 and the power-control cable 120. In the embodiment shown in FIG. 1, the line 114 supplies camera data and sensor measurements to computer 118 (or another external monitor) via a video connector 142. The connector panel 136 also includes a control input 146 described below.

As will be explained in greater detail below, a controller 150 controls viewing assembly 300. The controller 150 is connected on one side, by an umbilical cord containing power-control cable 120 to computer 118. Controller 150 is connected on another side to control input 146 on connector panel 136 via a cable or wireless communication. As shown in FIG. 1, controller 150 further includes a pan controller 152 and a tilt controller 154. Control signals generated by controllers 152, 154 are transmitted to viewing assembly 300 via power-control cable 120. Additionally, the RS232 link between computer 118 and viewing assembly 300 is established via controller 150. Thus, it is possible to generate and transmit computer controlled input information to viewing assembly 300 via controller 150. Likewise, computer 118 can receive information pertaining to at least one camera from viewing assembly 300 via controller 150.

The connector panel 136 also provides access to a power supply fuse 156, as well as a system power switch 158 and a power indicator 160. Although it is anticipated that the borescope system will often operate using the battery 134, the system also may be connected directly to an external power source using a power line (not shown) connected via a power connector 164. The external power line and power connector 164 also may be used to recharge the battery 134 when the system is not being used. Although the embodiment shown in FIG. 1 contemplates the use of a 12 volt power system, the borescope system of the present disclosure is in no way limited to 12 volt systems. Additionally, the case 130 also includes at least one storage compartment 172 for storing various components of the borescope system when the system is not in use or being transported. A borescope system according to the disclosure may permit control, measurement, and/or display of the camera assembly depth.

Figure 2A:
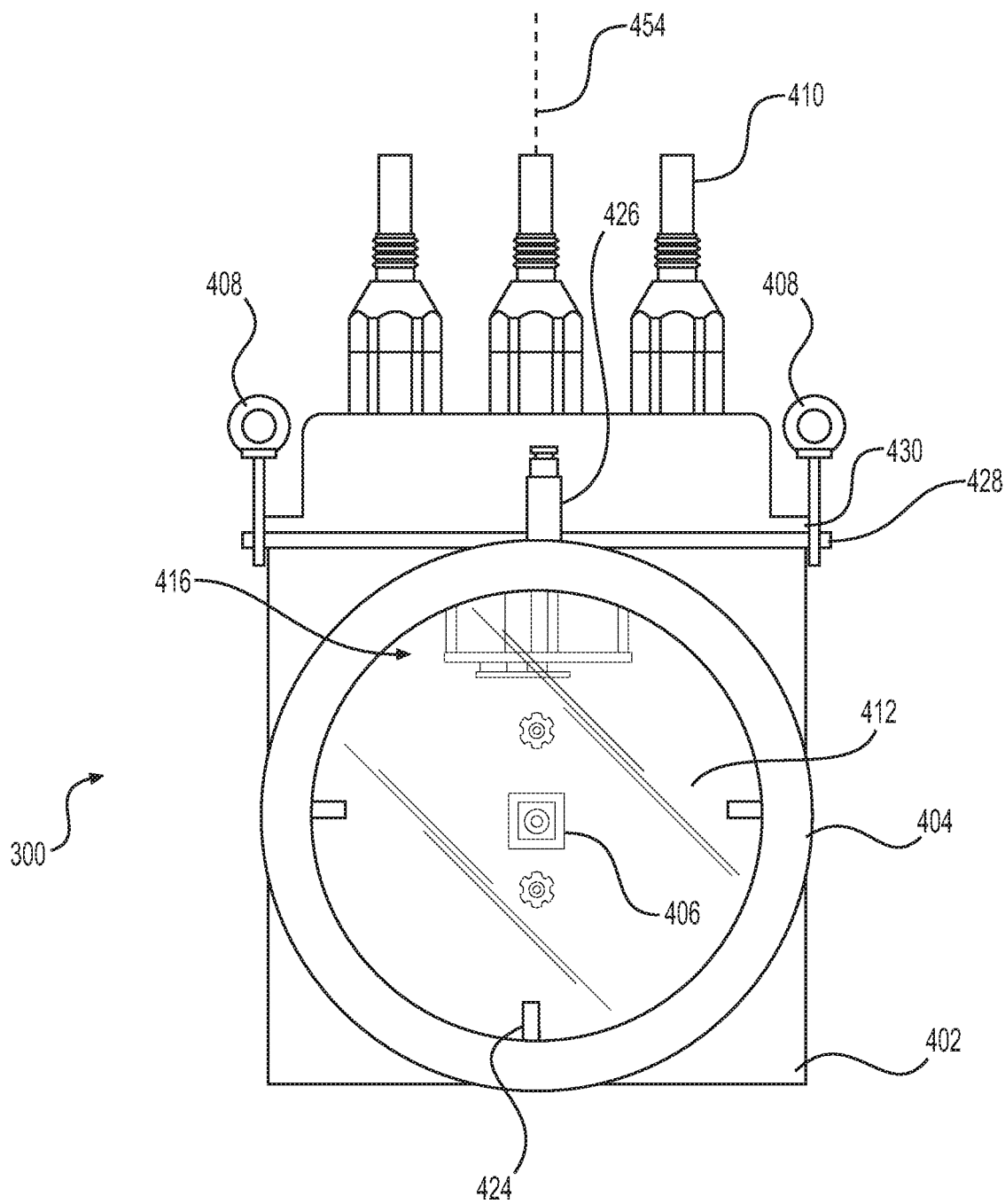
FIG. 2A is a front view of a viewing assembly of the system of FIG. 1.
Figure 2B:
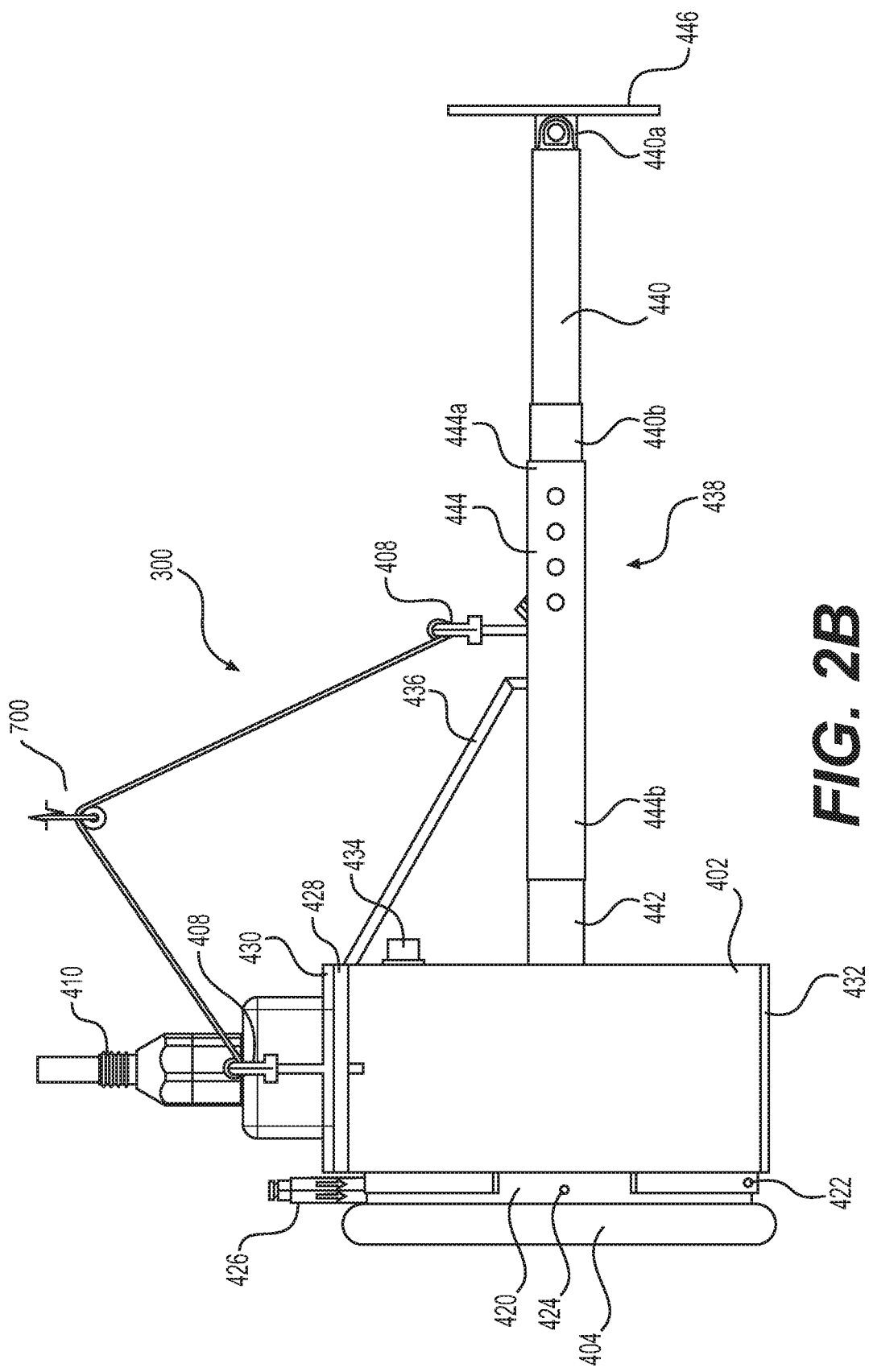
FIG. 2B is a side view of the viewing assembly of FIG. 2A.

Referring now to FIGS. 2A-2B, viewing assembly 300 includes a camera 406. As described above, the diameter of the borehole may be larger than a minimum (and/or maximum) diameter/width/length of the viewing assembly 300 (e.g., about 2-3 times more). However, in some embodiments, a maximum diameter/width/length of viewing assembly 300 may be substantially similar to or slightly less than the diameter of the borehole under inspection. Camera 406 may be positioned at a radial center of viewing assembly 300.

Camera 406 may be housed within a viewing chamber 402. The bottom of viewing chamber 402 may be sealed via a bottom glass fixing plate 432. The top of viewing chamber 402 may be sealed by a top plate 428 and a top cover 430 positioned above top plate 428. Viewing chamber 402 is rectangular in this embodiment and constructed using a rigid material such as aluminum. It is to be understood, however, that other materials, such as polyvinyl chloride (PVC), may be suitable for protecting camera 406, and that other suitable shapes of viewing chamber 402 may also be contemplated. A viewing window 412, circular in shape, provides camera 406 with viewing access to, e.g., the sides and interior of a borehole, while protecting camera 406 from damage due to contact with the surfaces being inspected. Any suitable transparent material, including, e.g., fiber glass or transparent plastic could be used to construct viewing window 412. Furthermore, it is contemplated that viewing window 412 may include any suitable shape, such as, e.g., rectangular, irregular, ovular, or the like.

Surrounding viewing window 412, along its circumference, is a support ring 420, onto which an annular tubing 404 is fixed. Tubing 404 may include any suitable, flexible material, such as rubber. Support ring 420 includes an air valve 426 by which tubing 404 may be inflated with pumped air or deflated, a check valve 424, and at least one inlet/outlet 422 through which any fluid, e.g., water, mud, slurry, may pass. For example, one air valve 426 may be utilized to inflate tubing 404 to the desired inflation level to achieve proper sealing of a side wall of the borehole. The tubing 404 may be inflated to a suitable degree that enables some degree of compression of tubing 404. In some exemplary embodiments, tubing 404 may be inflated to a diameter of 4 inches. Once the sealing is established, air may be pumped via inlet/outlet 422 to expel any water/mud entrapped within the seal.

Boreholes are often filled with a viscous mud, or slurry, especially in waterways projects. The slurry, however, obscures the view of the side walls of the filled borehole. Viewing chamber 402 and viewing window 412 provides camera 406 with a viewing interface of the filled borehole. In particular, upon being pressed against the side walls of the filled borehole, tubing 404 creates a seal on the curved side walls of the borehole and helps enable viewing assembly 300 to push out the trapped slurry and mud. According to the disclosure, a fluid source 175 (shown in FIG. 1) may supply pressurized air and/or water (e.g., a gas and a liquid simultaneously) to the support ring 420 to push out the slurry and mud from the space enclosed by tubing 404 and the sidewall of a borehole (or any surface against which tubing 404 is sealed), to provide a clear view of the borehole side surface even though viewing assembly 300 is submerged in the slurry. The trapped slurry and mud may be pushed out through inlet/outlet(s) 422 of support ring 420. Tubing 404 and support ring 420 thus help define a viewing area for camera 406 in situations where a camera could not otherwise view the walls of the borehole.

By moving the viewpoint of camera 406 in viewing chamber 402, the operator may obtain images and/or videos of sidewall surfaces and the interior of a borehole. Specifically, camera 406 may longitudinally move, tilt, and/or rotate along a plane defined by a vertical axis 454 relative to the viewing chamber 402, i.e., tilting camera 406 up to approximately 180 degrees (±90 degrees), as camera 406 is suspended in the borehole. A light source (LED) (not shown) may be located on the side of or within viewing chamber 402 e.g., on mounting brackets for camera 406, to illuminate the viewing area while camera 406 is capturing images and/or videos of the sidewall surfaces or interior of the borehole.

Figure 3:
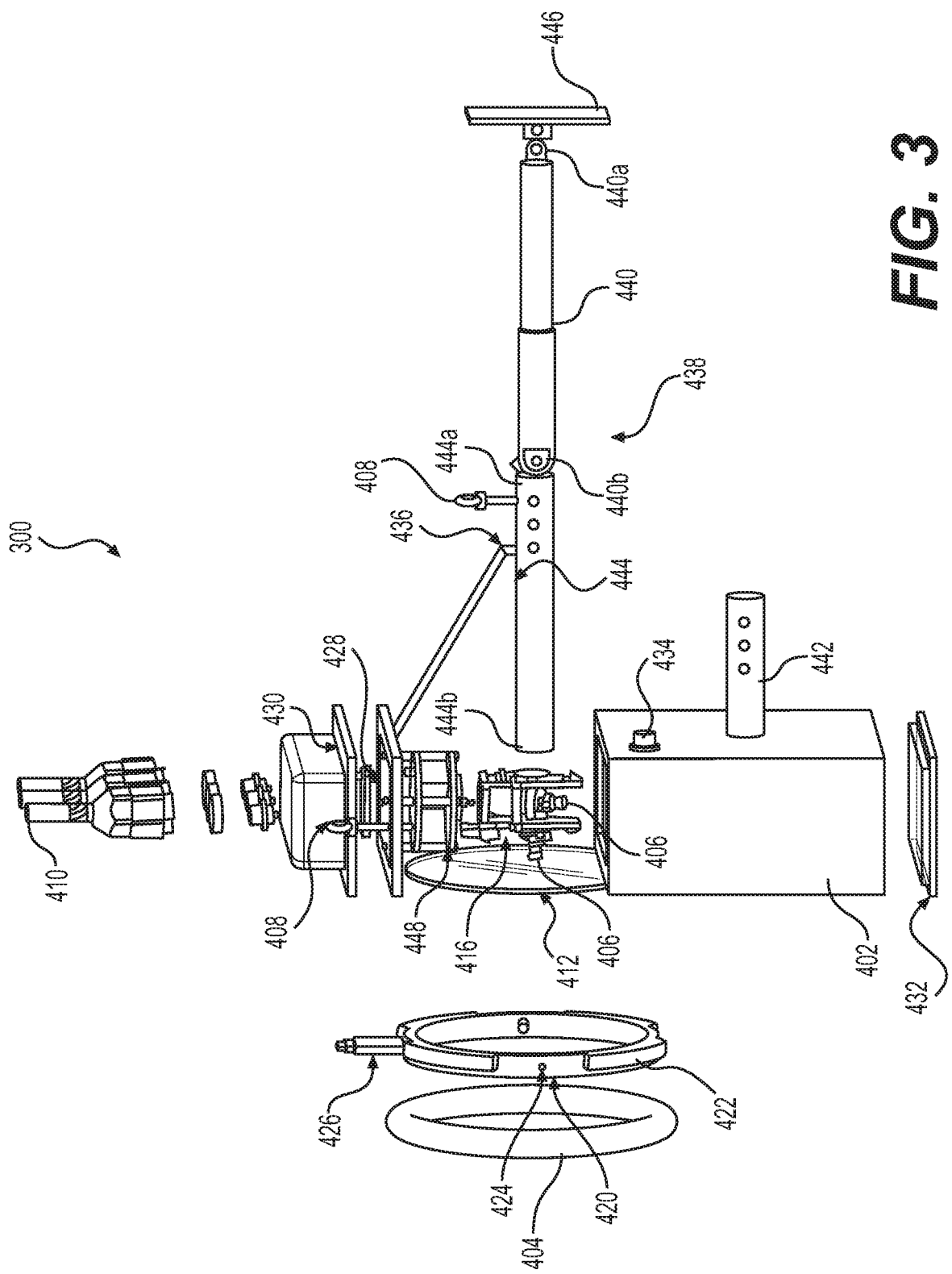
FIG. 3 is an exploded view of the viewing assembly of FIG. 2A.
Figure 5A:
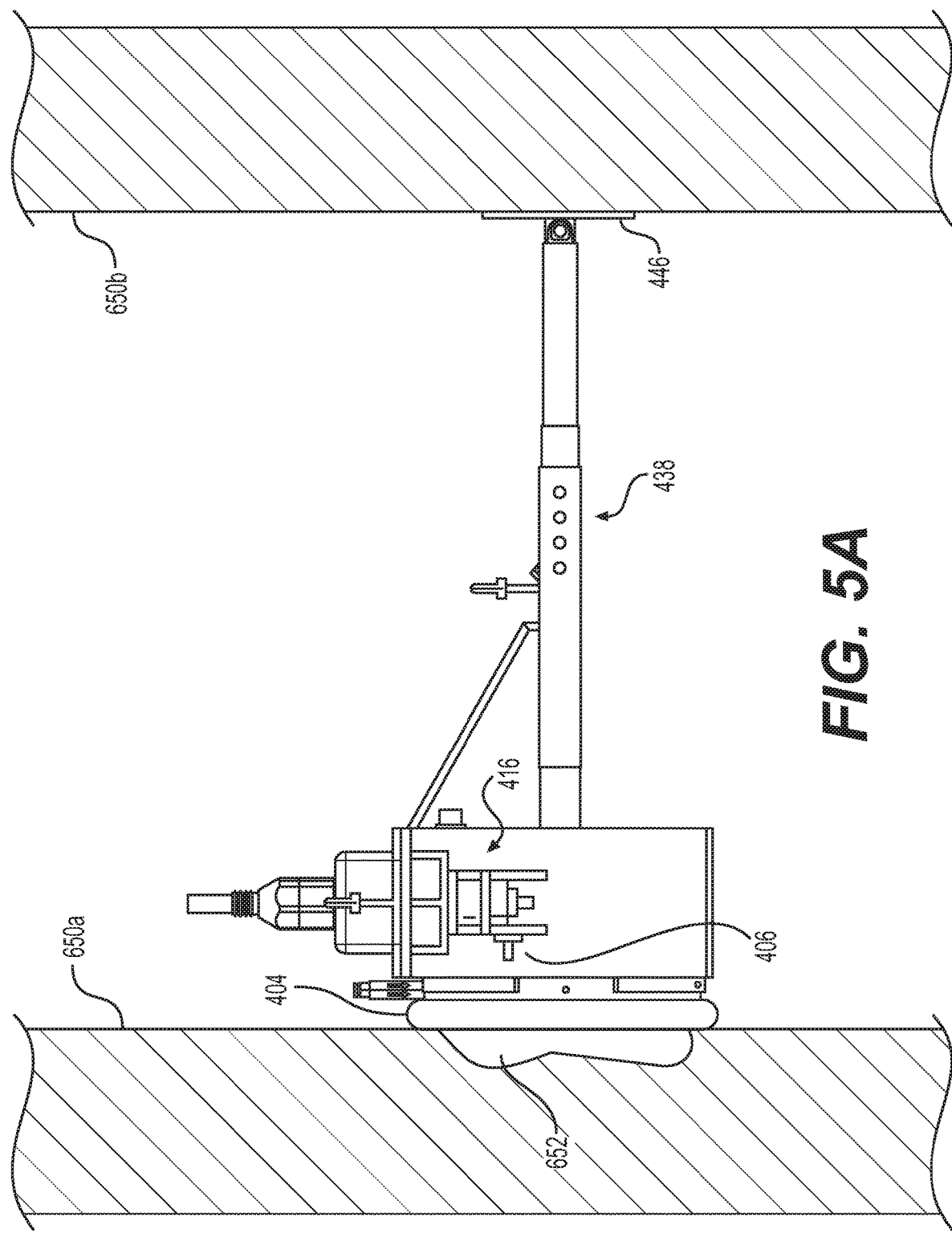
FIG. 5A is an illustration of the viewing assembly of FIG. 2A deployed in a borehole.

Referring to FIGS. 3 and 5, viewing assembly 300 further includes an extendable rod 438, configured to help secure viewing assembly 300 within a borehole. For example, extendable rod 438 may help press tubing 404 against one side 650a of a borehole. Extendable rod 438 includes a connector arm 442 on the side of viewing chamber 402 opposite of tubing 404. Connector arm 442 is a cylindrical tube having a series of pinholes laid out longitudinally. Connector arm 442 is coupled to an end 444b of an extension arm 444 (which could be a cylindrical tube having a slightly larger diameter than connector arm 442) by sliding extension arm 444 over connector arm 442. It is contemplated that connector arm 442 and extension rod 444 may be non-cylindrical, and include any other suitable shape and cross-section, such as, e.g., square, rectangular, triangular, ovular, or the like. Extension arm 444 is coupled to top plate 428 via a detachable or fixed support rod 436. Extension arm 444 also includes a series of pinholes laid out longitudinally. Because support rod 436 may be coupled to top plate 428, which is secured onto viewing chamber 402, extension arm 444 may be inhibited from sliding away from connector arm 442. Moreover, by aligning extension arm 444 such that at least one pinhole of connector arm 442 aligns with the at least one pinhole of extension arm 444, and pinning the aligned pinholes of both arms, connector arm 442 and extension arm 444 may be more securely coupled. The length of extendable rod 438 may be adjusted by the degree to which extension arm 444 is slid over connector arm 442, which may be indicated by the alignment of varying pinholes on both connector arm 442 and extension arm 444. In some embodiments, support rod 436 may be a telescoping support rod to permit movement between connector arm 442 and extension arm 444. It is noted, however, that other means of coupling connector arm 442 to extension arm 444 and adjusting the length of extendable 438 may be contemplated, including without the use of pinholes and/or without support rod 436, and is not limited as described herein. Furthermore, it is contemplated that extension arm 444 may have a smaller diameter than connector arm 442, and that extension arm 444 may slide within connector arm 442.

An end 444a of extension arm 444 furthest from ring 404 is pivotably coupled to one end 440b of a linear actuator 440. The other end 440a of actuator 440 is pivotably coupled to a wall plate 446 that is configured to press against a side 650b of a borehole that is opposite of side 650a that tubing 404 is to press against. In some examples, side 650b and side 650a may be positioned 180 degrees from one another about the circumference of the borehole. Thus, by pushing against side 650b opposite of tubing 404, extendable rod 438 may help support tubing 404 against side 650a of the borehole to provide a sealed environment between side 650a and viewing window 412. Tubing 404 may also be positioned around a depression 652 inside 650a of the borehole, forming a partial seal around depression 652. Fluid source 175 also may flush fluid and debris from depression 652 to enable viewing of depression 652 by camera 406.

Linear actuator 440 may be a waterproof linear piston, such as, for example, the PA-06 linear piston made by Progressive Automations. The linear actuator 440 may have a stroke from, e.g., 2 inches to 24 inches, a brushed DC motor, and may include, e.g., an aluminum housing. Linear actuator 440 may be IP67 rated, or may have another suitable rating. Linear actuator 440 may include a polyformaldehyde gear and a stainless steel rod. Linear actuator 440 may include a sensor 440a (referring to FIG. 1), which may be a current sensor or Hall-effect sensor.

Figure 5B:
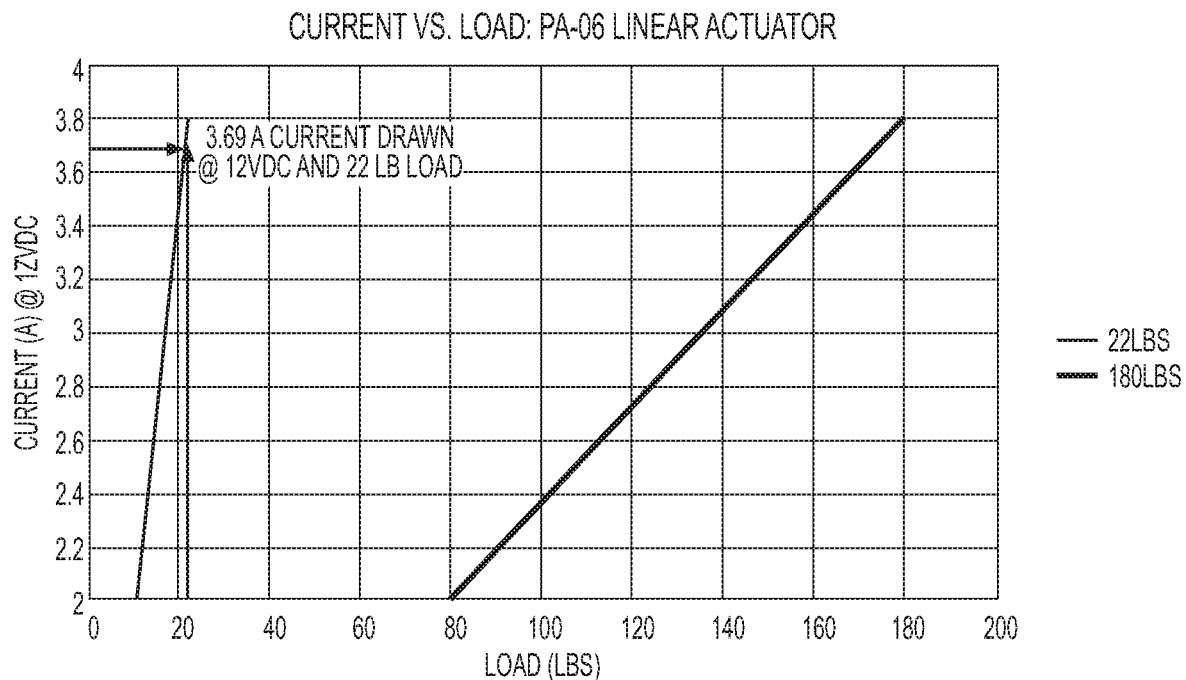
FIG. 5B is a graph illustrating the relationship between current drawn and load of a linear actuator.
Figure 5C:
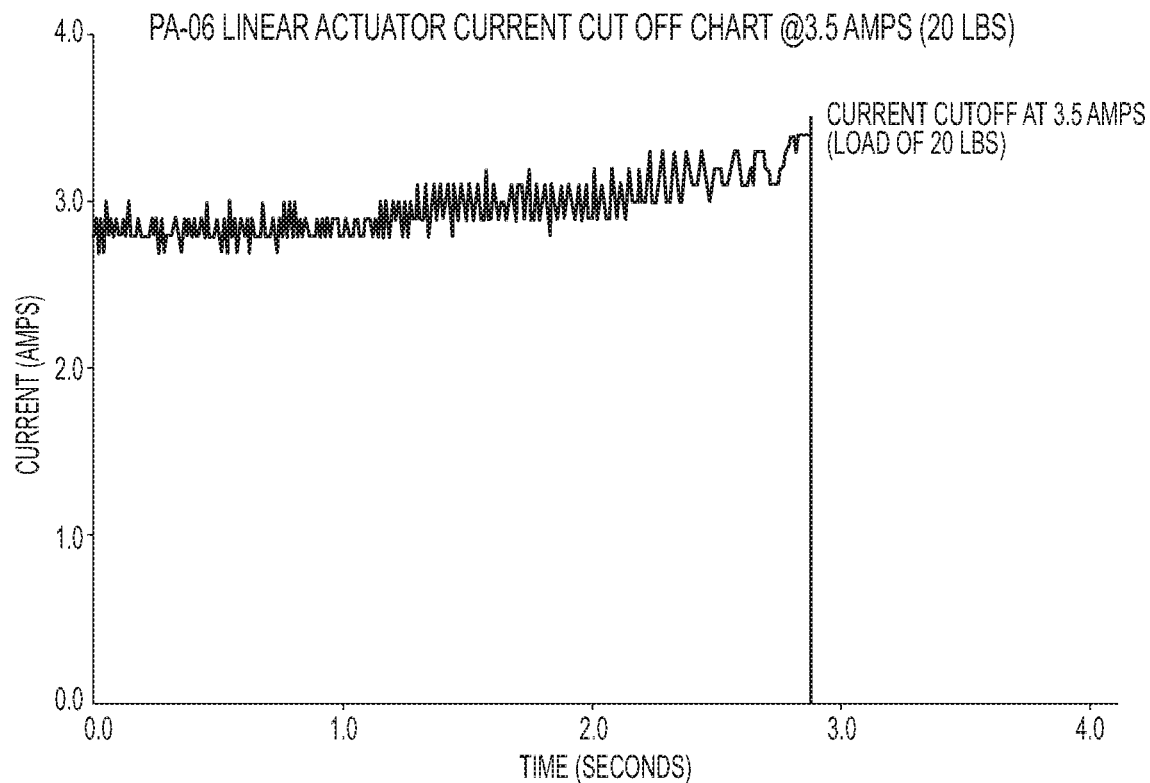
FIG. 5C is chart illustrating a current cut off/threshold for a linear actuator.

Controller 150 may be coupled to linear actuator 440 and sensor 440a, and may be configured to increase or decrease a length of extendable rod 438 based on input from sensor 440a. For example, controller 150 may increase the length of extendable rod 438 until sensing of a spike in current by sensor 440a. That is, the current applied to linear actuator 440 may increase linearly or by some other rate until extendable rod 438 is fully extended within a given borehole (i.e., until tubing 404 is pushed against a side of the borehole. Upon sensing the spike in current, controller 150 may cease further extension of extendable rod 438, and may instead deliver fluid to or withdraw fluid from a space between the borehole wall and window 412 (to improve visibility of the side of the borehole). This is illustrated in FIGS. 5B-5C. The chart of FIG. 5B shows the positive linear relationship between the current drawn and load. As can be seen, 3.69 amps of current is drawn at 12V DC and 22 lbs. load. In some exemplary embodiments, linear actuator 440 may be calibrated to cut off any further extension of rod 438 once the current drawn reaches a set threshold value, for example, 3.5 amps (equivalent to 20 lbs. of load in an actuator rated for 22 lbs.) For example, controller 150 may stop the flow of current to linear actuator 440, or this step may be performed manually. The threshold may be set when linear actuator reaches a certain percentage or its rated load such as, for example, more than 50%, more than 60%, more than 70%, more than 80%, or more than 90%, of its rated load. FIG. 5B also shows current versus load for a linear actuator rated for 180 lbs. The cut off/threshold for a linear actuator is further illustrated in the chart of FIG. 5C. As shown, a baseline current of about 2.8 amps may be drawn, and as load increases, the current applied to linear actuator 440 also increases until a threshold/cut off value (e.g., of 3.5 amps (e.g., 20 lbs. of load)) is reached. It is noted that calibration of a threshold value is not limited to the aforementioned example, and that any suitable value may be pre-set depending on application, actuator, load rating, or the like. Calibrating a threshold may ensure that extendable rod 438 stops extension at the desired location when a desired resistance is met (meaning that the viewing chamber 402 is appropriately positioned against the sidewall of a borehole. It is further contemplated that expansion of linear actuator 440 may be stopped manually by user based on the values sensed by sensor 440a.

The amount of air or gas within tubing 404 may be calibrated based on various factors, including, how large of a gap can be sealed when tubing 404 is pressed against the curved walls of a borehole. For example, when a circular tubing is pressed against the curved walls, the vertical sides of the tubing is in contact with the wall, and when pressure is applied, the vertical sides compress, pushing it toward the center of the tubing at its top and bottom. This results in bulging of the tubing at its center, thus closing the gap of the concave curvature of the drilled hole. The size/dimensions of the side wall gap of the borehole is not particularly limited. Tubing 404 may seal borehole side wall gaps having diameters/widths of 30 inches, 60 inches, 120 inches, etc. The smaller the gap, the more curved the walls will be and therefore, the most difficult gap to seal would be the 30 inch diameter. For gaps with 30 inch diameters, the maximum gap size that needs to be covered is generally less than 1 inch. Tubing 404 may be inflated accordingly to cover such gap sizes. In some examples, tubing 404 may be inflated to an extent so that tubing 404 is approximately double the size of the gap that needs to be closed. Thus, for gaps with 30 inch diameters, tubing 404 may be inflated to a diameter of 4 inches to accommodate for possible wall-caving which would enlarge the gaps. Thus, it is preferred that tubing 404 is dynamically inflated once viewing assembly 300 is lowered to the correct position and tubing 404 is jacked against the side wall.

For different sized holes in the borehole sidewall, the amount of pressure applied to tubing 404 may be calibrated. In some examples, controller 150 may use image processing algorithms to estimate a size of the hole based on the image from imaging assembly 406, and automatically pressurize tubing 404 to a corresponding amount using, for example, a look-up table correlating hole size with the pressure of tubing 404.

Viewing assembly 300 also includes hinges 408 from which viewing assembly 300 may be coupled to a suspension mechanism, allowing for viewing assembly 300 to descend into and remain suspended within a borehole. As shown in FIGS. 2A and 2B, hinges 408 are positioned on opposing sides of top cover 430 and top plate 428. The exact positions of hinges 408 along the sides of top cover 430 and top plate 428 are not particularly limited. In some embodiments, hinges 408 are aligned across the length of top cover 430. As shown in FIG. 2B, a third hinge 408 is positioned on extension arm 444, near end 444a. However, the exact position of this third hinge 408 is not particularly limited, and may vary along arm 444. To descend and suspend viewing assembly 300 (plumb the viewing assembly), any suitable wire(s)/rope(s) may be employed to couple viewing assembly 300 to a suspension mechanism or pulley 700, via hinges 408. The employed wire(s)/rope(s) may be tensioned to appropriately adjust the center of gravity of viewing assembly 300.

In addition, viewing assembly further includes a pin connector 434, and a connector assembly 410, by which viewing assembly 300 may be connected to connector panel 136. Pin connector 434 may be utilized for attaching a power/data source to linear actuator 440. Various cabling may be stored in chamber 402, and the power/data source to actuator 440 may be spliced to pin connector 434.

Figure 4:
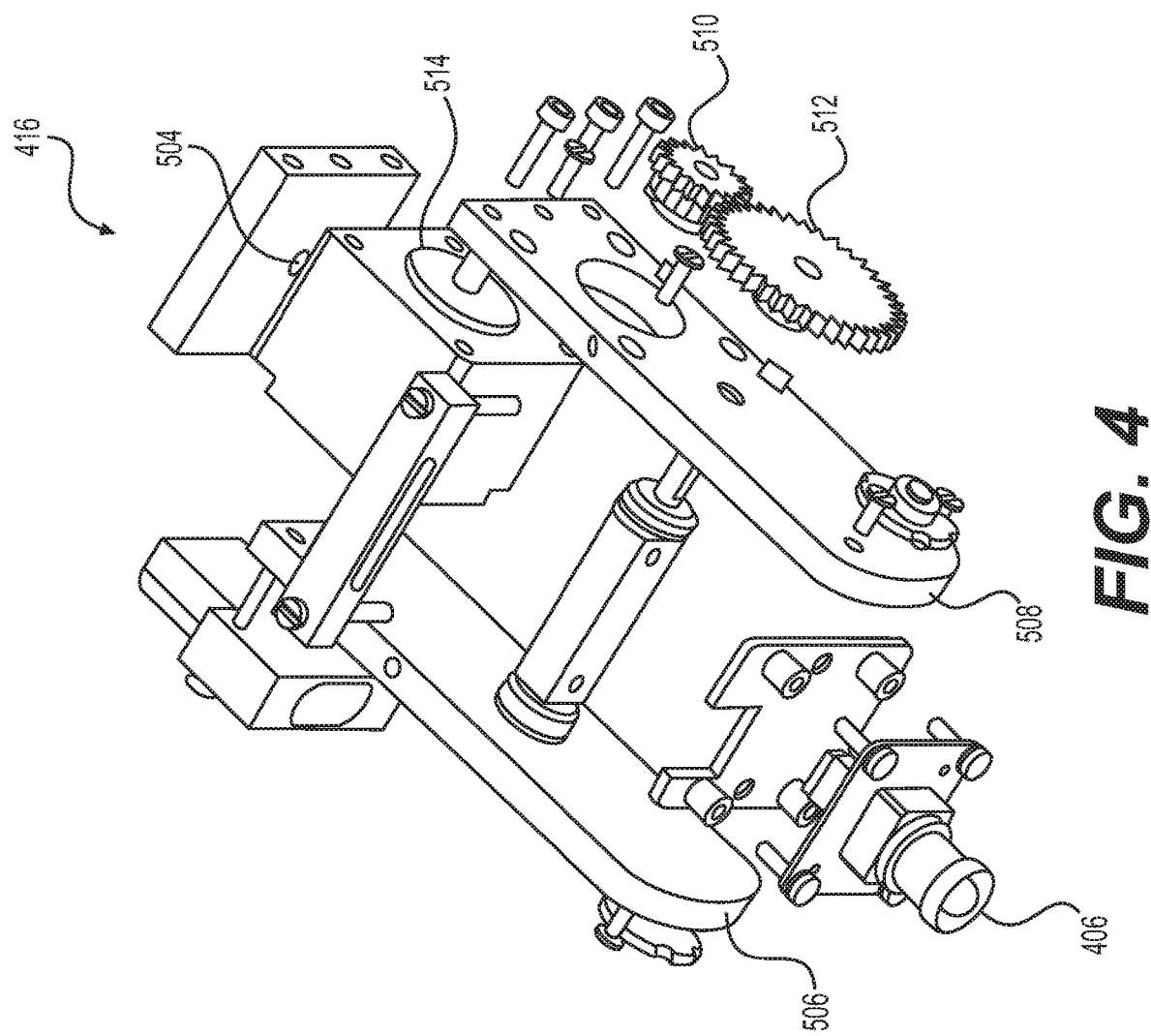
FIG. 4 is a schematic view of a camera assembly used with the viewing assembly of FIG. 2A.

FIG. 4 is a schematic view of camera assembly 416 of the borescope system according to the present disclosure. Camera assembly 416 includes a miniature color or black and white charge coupled (CCD) camera 406 with a wide angle (e.g. approximately 180 degrees) lens. In one embodiment, the width of camera assembly 416, including the miniature camera 406, is substantially less than the diameter of the borehole under inspection (e.g., a few inches compared to several feet). Camera 406 is protected by side plates 504, 506, and 508. These side plates 504, 506, and 508 are constructed using a rigid material such as, e.g., aluminum. It is to be understood, however, that other materials, such as PVC, may be suitable for use in the side plates. For example, one embodiment of the present disclosure uses an aluminum side plates enclosed in a PVC casing.

In some embodiments, camera 406 may be fixed onto camera assembly 416 and may be non-rotatable. However, in the embodiment illustrated in FIG. 4, camera assembly 416 also encloses a tilt and pan gear mechanism including gears 510 and 512. A system operator controls the tilt and pan gear mechanism to rotate camera 406 through a wide range of motion (e.g., 360 degrees in-plane and 180 degrees out-of-plane). Electronic control board 514 controls the tilt and pan gear mechanism and camera 406 in response to operator inputs from controller 150 via power unit 132 and power-control cable 120 (see also FIG. 1). Electronic control board 514 may provide instructions to a vertical servo motor for tilting camera 406 and a horizontal servo motor for rotating it. Electronic control board 514 provides the connected servo motors with electrical control signals in response to operator inputs from the tilt and pan controllers 152, 154 of controller 150 (see FIG. 1). In particular, control board 514 includes a micro-controller with an analog-to-digital (A/D) converter and a pulse width modulation output driver. The micro-controller receives analog input signals from tilt and pan controllers 152, 154 and converts the received signals to pulse width modulated output signals for accurately controlling the position of the servo motors using control and driver techniques that are known in the art.

The functionality of the tilt and pan gear mechanism may be further described by reference to the vertical servo motor and the horizontal servo motor. The tilt mechanism and vertical servo motor constitute a first rotational motion stage for rotating camera 406 in a plane defined by a vertical axis 224 relative to the viewing chamber 402, i.e., tilting camera 406 up to approximately 180 degrees (±90 degrees), as camera 406 is suspended in the borehole. Likewise, the pan mechanism and horizontal servo motor constitute a second rotational motion stage for rotating camera 406 about vertical axis 224 over approximately 360 degrees as camera 406 is suspended in the borehole. By manipulating tilt and pan gear mechanism, also referred to as a motion control mechanism, the operator can control and direct a camera viewing angle or line of sight, which in turn enables the operator specify areas of the borehole for viewing and inspection.

Figure 6:
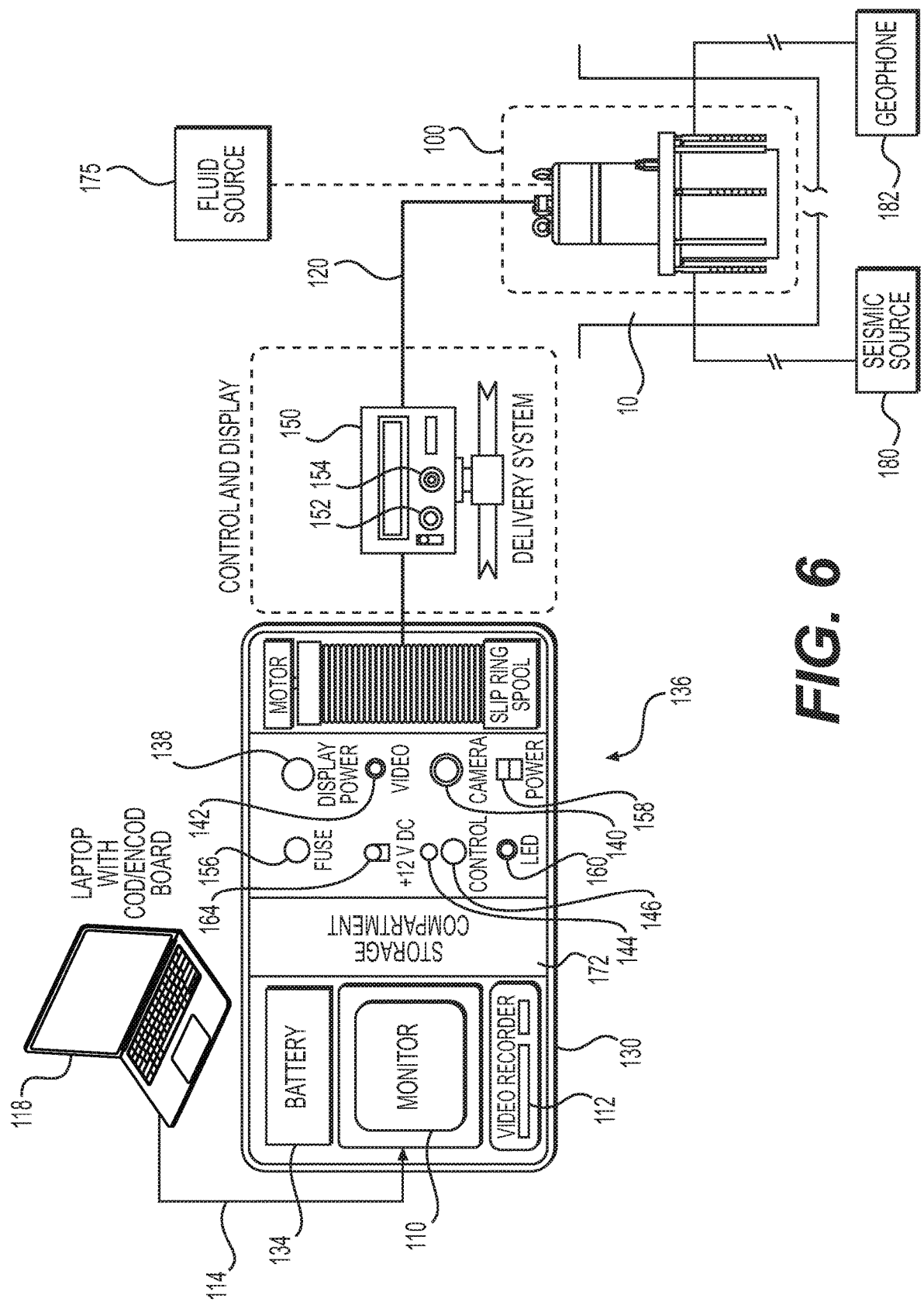
FIG. 6 is a schematic illustration of another borescope system for visually inspecting and profiling the bottom of drilled shafts according to an embodiment of the disclosure.

FIG. 6 illustrates a borescope system visually inspecting and profiling the bottom of drilled shafts in block diagram form. The system may be the same as that illustrated in FIG. 1, except a measurement assembly 100, instead of viewing assembly 300, is connected to display 110. In some embodiments, measurement assembly 100 and viewing assembly 300 may be included within the same borescope system and may be connected to the same display or different displays. For example, measurement assembly 100 and viewing assembly 300 may be interchangeable such that they can be used with the same control system (e.g., the same connector panel 136 and associated components).

Furthermore, measurement assembly 100 may further include a seismic source 180 and a geophone (or other suitable sensor) 182. Seismic source 180 may be any device that generates controlled seismic energy used to perform both reflection and refraction seismic surveys. Seismic source 108 may provide single pulses or continuous sweeps of energy, generating seismic waves, which travel through the ground. In one example, seismic source 180 may be a hammer (e.g., a pneumatic hammer), which may strike a metal plate to generate the seismic waves. Some of the seismic waves generated by seismic source 180 may reflect and refract, and may be recorded by geophone 180. It is also contemplated that seismic source 180 and geophone 182 may be coupled to viewing assembly 300 in some embodiments.

Seismic source 180 and geophone 182 may be used to investigate shallow subsoil structure, for engineering site characterization, or to study deeper structures, or to map subsurface faults. The returning signals from the subsurface structures may be detected by geophone 182 in known locations relative to the position of the subsurface structures.

Figure 7B:
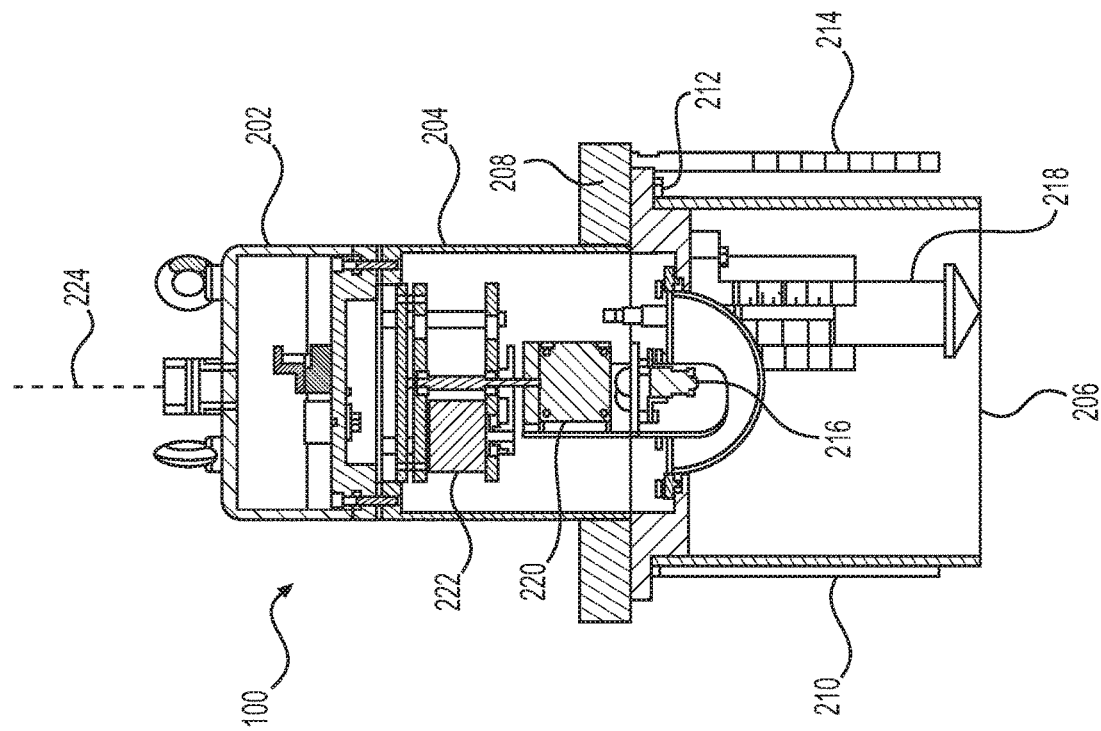
FIG. 7B is a cross-sectional view of the measurement assembly of FIG. 7A, taken along line 7B-7B.
Figure 7A:
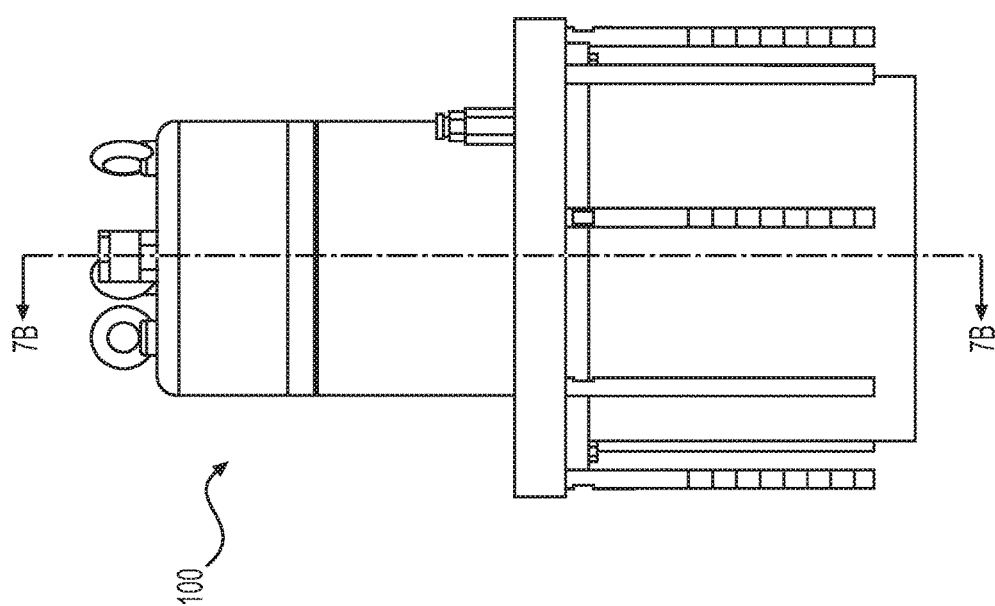
FIG. 7A is a side view of a measurement assembly of the system of FIG. 6.

Referring now to FIGS. 7A and 7B, measurement assembly 100 includes a camera 216 and an ultrasonic penetrometer 218. The size of the borehole may be much larger than the size of the measurement assembly 100. In one embodiment, the width of measurement assembly 100, including camera 216, is substantially less than the diameter of the borehole under inspection (e.g., approximately ten inches compared to several feet). The center of the measurement assembly 100 may include a central axis 224. Camera 216 and ultrasonic penetrometer 218 are positioned concentrically about central axis 224.

Camera 216, which may be the same as or substantially similar to camera 406 illustrated in FIG. 4, may be housed within an assembly 204. Assembly 204 is generally cylindrical in this embodiment and constructed using a rigid material such as aluminum. It is to be understood, however, that other materials, such as polyvinyl chloride (PVC), may be suitable for protecting camera 216. Observation chamber 206 provides camera 216 with viewing access to, e.g. a borehole, while protecting camera 216 from damage due to contact with the surfaces being inspected. Any suitable transparent material, including, e.g., glass or transparent plastic could be used to construct observation chamber 206.

Supporting or protective rods 214 are attached to assembly 204 and surround observation chamber 206. Supporting rods 214 protect chamber 206 when the system is lowered into a borehole. Supporting rods 214 may be circumferentially spaced apart from one another about axis 224, and may include graduated markings (indicative of length, e.g., a ruler) along their respective lengths. When measurement assembly 100 is positioned at the bottom of a borehole, measurement assembly 100, including supporting rods 214, may sink into a soft material at the bottom of the borehole. When viewed by a camera 216, the markings of supporting rods 214 may help determine how far measurement assembly 100 has sunk into the bottom of the borehole.

Observation chamber 206 is a generally cylindrical structure constructed of rigid, transparent plastic or a similar material, although other suitable shapes are also contemplated. Observation chamber 206 may have a larger diameter than assembly 204. In an alternative embodiment, observation chamber 206 is made of a flexible, durable, transparent plastic. Observation chamber 206 is particularly well-suited for use in slurry-filled boreholes.

Observation chamber 206 provides camera 216 with a viewing interface. In operation, a system operator lowers camera 216 into observation chamber 206. Fluid source 175 may supply pressurized air and/or water (e.g., a gas and a liquid simultaneously) to the observation chamber 206 to push out slurry and mud from the space enclosed by observation chamber 206 to provide clear view of the borehole bottom or side surface even though measurement assembly 100 is submerged in the slurry. Observation chamber 206 thus helps define a viewing area for camera 216 in situations where a camera could not otherwise view the bottom of the borehole. By moving the viewpoint of camera 216 in observation chamber 206, the operator may obtain images and videos of the borehole's interior surface. A light source (LED) may be located on the side of observation chamber 206 e.g., on mounting brackets for camera 216, to illuminate the viewing area while camera 216 is capturing images and videos of the interior surface of the borehole. In some embodiments, observation chamber 206 may have a closed bottom end. In such an embodiment, measurement assembly 100 may be lowered into a borehole while flush with the inner circumferential surface of the borehole, to enable a user to view the inner circumferential surface. The closed bottom end may be achieved via a removable end cover to enable measurement assembly 100 to have multiple operating modes, e.g., one mode with an open bottom end where fluid can move into and out of observation chamber 206, and another mode with a closed bottom end where an exterior of observation chamber 206 forms a fluid tight seal around an interior volume of observation chamber 206.

Measurement assembly 100 also includes ultrasonic penetrometer 218 for sensing physical characteristics of the soil and bore. Ultrasonic penetrometer 218 may be used to measure characteristics of soil such as sediment thickness, calibrated resistance, and slurry density. The present disclosure may be used to determine the structural adequacy of a borehole by capturing clear and accurate images (and videos) of the borehole's bottom and side surfaces. Cleanliness of the bottom and sides of the borehole from any soil or rock residues is an important factor for determining whether the borehole is adequate for constructing deep foundations or slurry walls. Also, evaluating borehole adequacy may include identifying cracking in pipe piles or defects in borehole casing.

Moreover, as illustrated in FIG. 7B, a top cover assembly 202 connects to assembly 204 on one side and to the control and display system on the other side via power-control cable 120 (as shown in FIG. 6). Assembly 204, top cover assembly 202, observation chamber 206, and supporting rods 214 are assembled to create a substantially watertight protective housing for the electronics of measurement assembly 100.

Figure 8A:
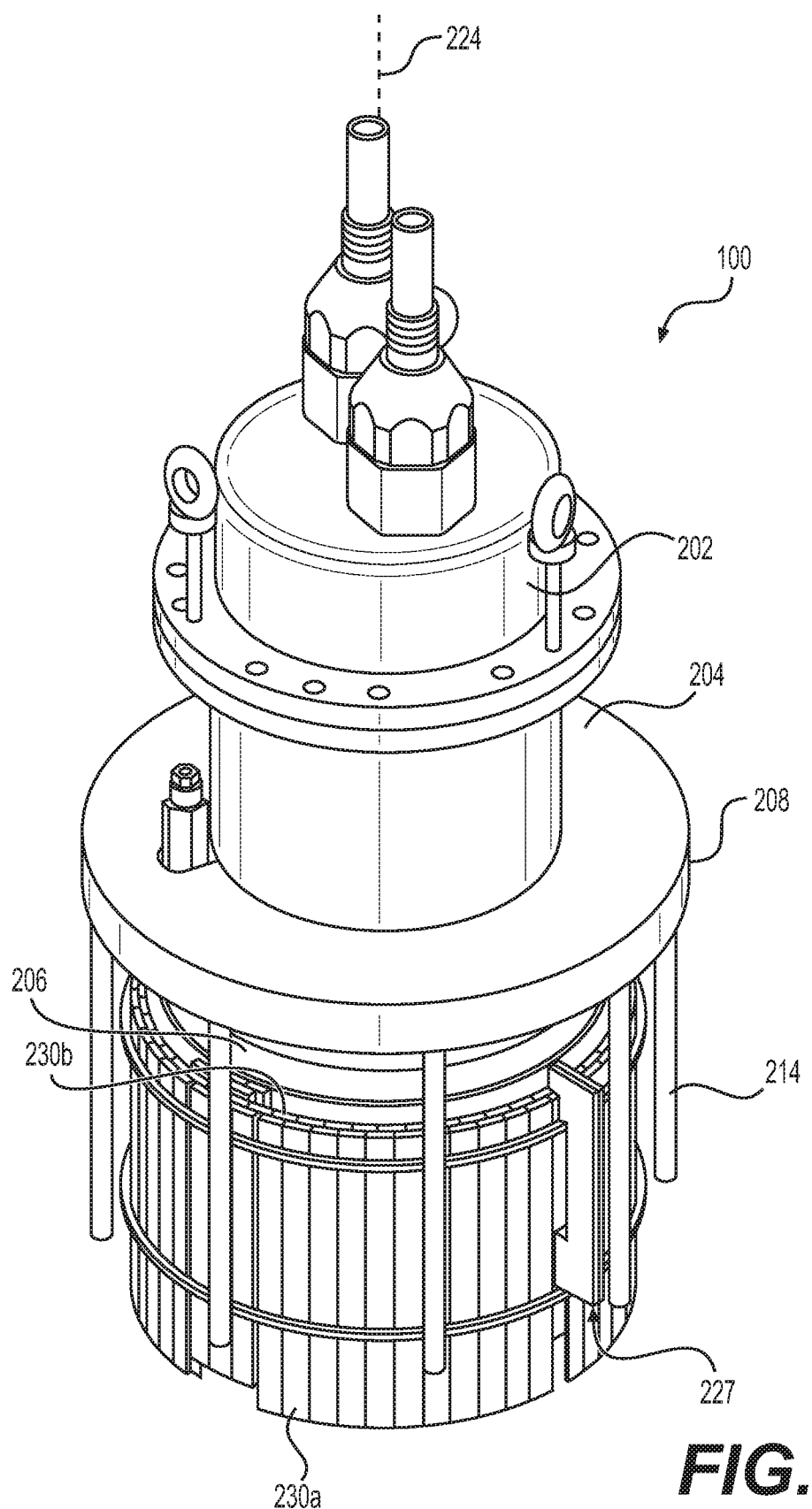
FIG. 8A is a perspective view of a measurement assembly.
Figures 8B, 8C:
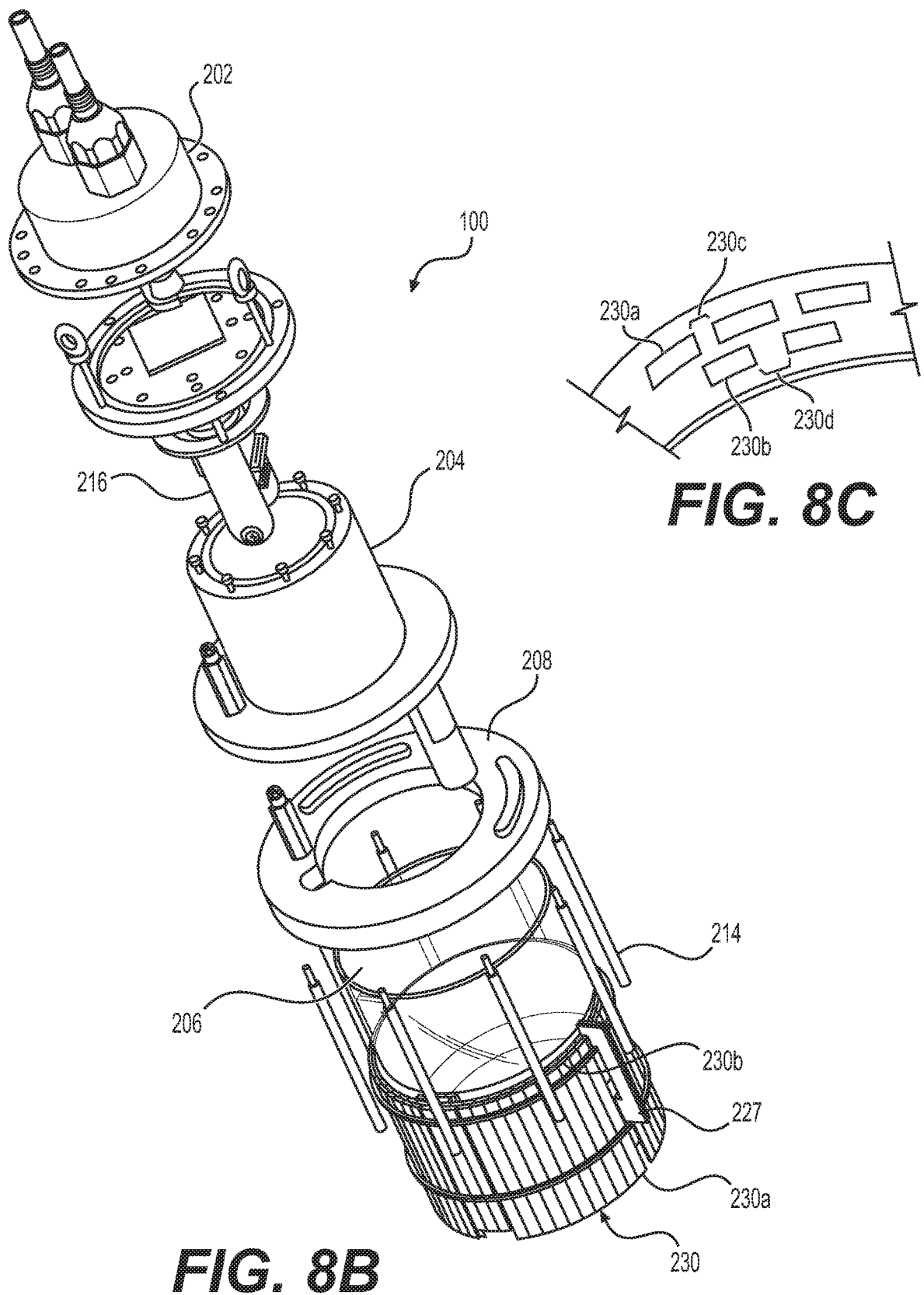
FIG. 8B is an exploded view of the measurement assembly of FIG. 8A.
FIG. 8C is a schematic illustration of a plurality of strips used with the measurement assembly of FIG. 8B.

FIGS. 8A to 8C depict another embodiment of measurement assembly 100. In this embodiment, measurement assembly 100 further includes an annular clamp assembly 227 surrounding observation chamber 206. Clamp assembly 227 may include a plurality of strips 230. Strips 230 are arranged in clamp assembly 227 in a manner such that strips 230 extend along or substantially parallel to axis 224. That is, strips 230 extend generally longitudinally along measurement assembly 100. Clamp assembly 200 includes an outer row 230a of strips 230, and an inner row 230b of strips 230. As can be seen in FIG. 8C, strips 230 of outer row 230a are arranged so that adjacent outer strips 230 in outer row 230a are spaced circumferentially from one another by a gap 230c. Adjacent strips 230 of inner row 230b are spaced circumferentially from one another by a gap 230d. Each strip 230 from outer row 230a is directly radially outward of a gap 230d between adjacent inner strips 230b, and each inner strip 230 from inner row 230b is directly radially inward of a gap 230c between adjacent outer strips 230a. This staggered arrangement of strips 230 in rows 230a and 230b helps create a seal around observation chamber 206. Because strips 230 may fully cover the borehole side wall viewing interface provided by observation chamber 206, in some embodiments, measurement assembly 100 does not include observation chamber 206, and annular clamp assembly 227 may be coupled to a top plate 208. Similarly, because strips 230 may also inhibit camera 216 from viewing supporting rods 214 and any markings thereof, in some embodiments, measurement assembly 100 does not supporting rods 214. However, in other embodiments, one or both of observation chamber 206 and supporting rods 214 are included in measurement assembly 100.

Figure 9A:
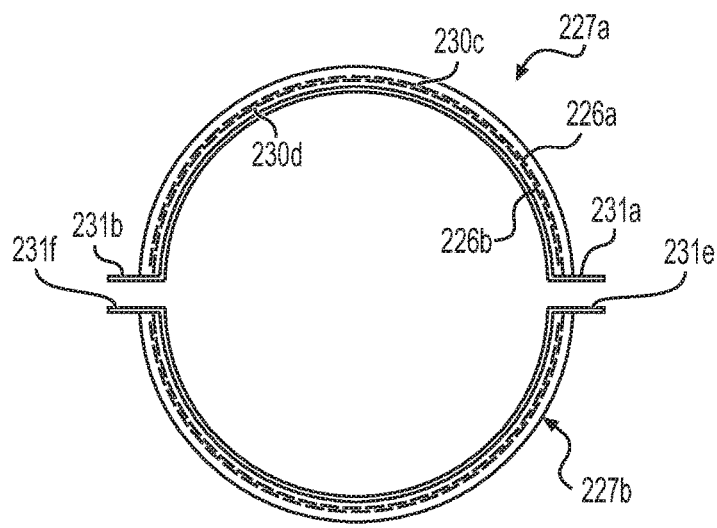
FIG. 9A is a top view of a clamp assembly used with the measurement assembly of FIG. 8A.
Figure 9B:
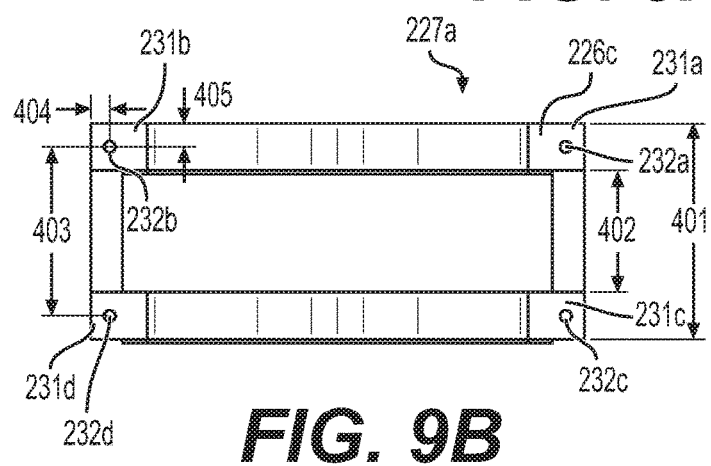
FIG. 9B is a side view of a portion of the clamp assembly of FIG. 8A.
Figure 9C:
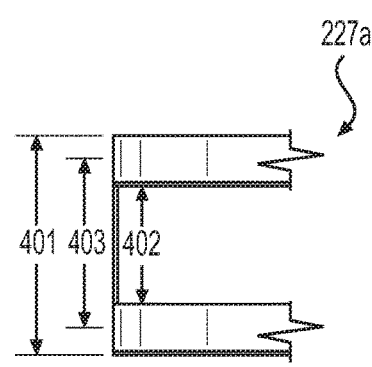
FIG. 9C is another side view of the portion of the clamp assembly in FIG. 9B.
Figure 9D:
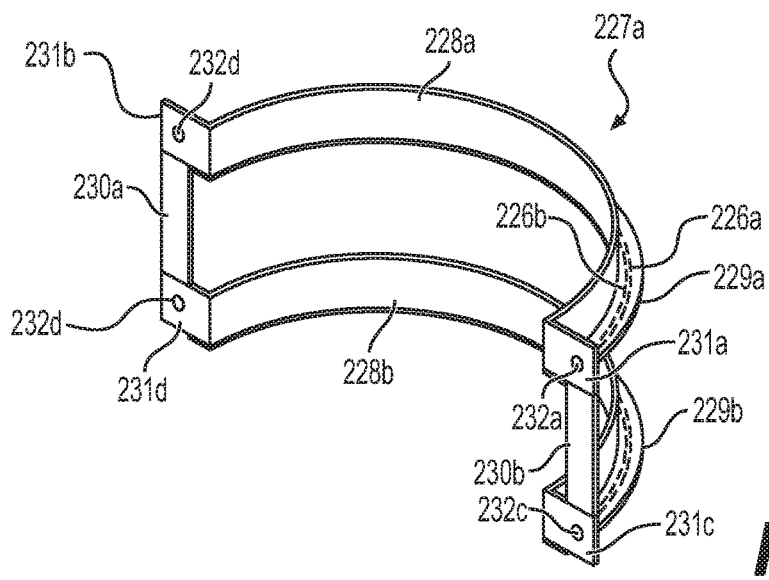
FIG. 9D is a perspective view of the portion of the clamp assembly of FIG. 9B.

FIG. 9A shows two halves, 227a and 227b, of clamp assembly 227, and FIG. 9D shows a perspective view of one half 227a. Each half, 227a and 227b, of clamp assembly 227, may have the shape of a half-circular or semi-circular curved arc, thereby forming an annular clamp assembly 227 when both halves are coupled together. Each half, 227a and 227b, also includes a top circumferential flange 229a and a bottom circumferential flange 229b, both of which extend radially around the curved arc shape of clamp assembly 227. Flanges 228b and 229b may be the radially outermost portion of clamp assembly 227 along their respective arcs. The top circumferential flange 229a is supported by and protrudes radially outward from a top curved arm 228a, and the bottom circumferential flange 229b, likewise, is supported by and protrudes radially outward from a bottom curved arm 228b. A first longitudinally extending support 230a and a second longitudinally extending support 230b coupler coupled to top curved arm 228a and bottom curved 228b at respective junction tabs, i.e., 231a-d. In particular, support 230a is coupled to arm 228a at junction 231b, and is coupled to arm 228b at junction 231d. Support 230b is coupled to arm 228a at junction 231a, and is coupled to arm 228b at junction 231c.

Top circumferential flange 229a and bottom circumferential flange 229b each include an outside row of outer strip slots 226a and an inside row of inner strip slots 226b. To accommodate outer row 230a of strips 230, and inner row 230b of strips 230, described in FIG. 8A, outer strip slots 226a may be arranged so that adjacent slots are spaced circumferentially from one another by gap 230c. Similarly, adjacent inner strip slots 226b may be spaced circumferentially from one another by gap 230d. Each outer strip slot 226a is directly radially outward of a gap 230d between adjacent inner strip slots 226b, and each inner strip slots 226b is directly radially inward of a gap 230c between adjacent outer strip slots 226a. Furthermore, strip slots, 226a and 226b, in top circumferential flange 229a are longitudinally aligned with strip slots, 226 and 226b, in bottom circumferential flange 229b, so that a longitudinally-extending strip 230 can be movably retained in a longitudinally-aligned pair of strip slots.

FIGS. 9B-9C show various dimensions of one half 227a of clamp assembly 227. A dimension 401 is length of assembly 227 in the longitudinal direction (along axis 224). An example of dimension 401 may be 113.50 mm. A dimension 402 is the length of the longitudinally extending supports, 230a-230b, or the distance between the longitudinally-closest portions of arms 228a and 228b, and an example of dimension 402 may be 63.50 mm. A dimension 403 is the distance from the center of one junction hole, 232a or 232b, to the center of a longitudinally opposed junction hole, 232c or 232d. An example of dimension 403 may be 86.50 mm. A dimension 404 is the distance from the center of one junction hole, 232a, to the radially-outermost edge of its respective junction tab, 231a, in a radial direction. An example of dimension 404 may be 10 mm. A dimension 405 is the distance from the center of one junction hole, e.g., 232a, to the longitudinally-outermost edge of a closest curved arm, e.g., 228a, in a longitudinal direction. An example of dimension 405 may be 12.50 mm. It is noted that the dimensions of clamp assembly 227 are not limited to the aforementioned examples, and that clamp assemblies of any suitable dimensions may be used.

FIGS. 10A-10D depict a strip 230 to be held within clamp assembly 227. Strip 230 includes a strip panel 234, which may be inserted into outer strip slot 226a or inner strip slot 226b, and a strip hanger 232 on one longitudinal end of strip panel 234. However, it is contemplated that a strip hanger 232 could be located on both longitudinal ends of strip panel 234. Strip hanger 232 may be a protruding tab configured to prevent strip 230 from falling through the slots 226a or 226b of clamp assembly 227 when inserted therein. Strip hanger 232 may extend substantially perpendicularly from strip panel 234. Strip hanger 232 also may extend substantially parallel to flanges 229a and 229b, when a strip 230 is coupled to assembly 227. When a strip 230 is coupled to assembly 227 (and also assembly 100), top flange 229a may act as a stop against which strip hanger 232a may abut, preventing strip 230 from disengaging from assembly 227 (or assembly 100). Movement of strips 230 in the upward direction may be limited by top plate 208 (which acts as a stop against which strip hanger 232 may abut in the upward longitudinal direction). Thus, strips 230 may move freely in the longitudinal direction between top flange 229b and top plate 208.

Exemplary dimensions of strip 230 are provided in FIGS. 10B-10D. A dimension 500 is the longitudinal length of strip 230, and an example of dimension 500 may be 154.50 mm. A dimension 501 is the width of strip hanger 232, and an example of dimension 501 may be 3.90 mm. A dimension 502 is the thickness of strip hanger 232 in the longitudinal direction, and example of dimension 502 may be 2 mm. A dimension 504 is the thickness of strip panel 234, and an example of dimension 504 may be 0.90 mm. A dimension 503 is the distance strip hanger 232 protrudes outwardly relative to strip panel 234. An example of dimension 503 may be 3 mm. A dimension 505 is the width of strip 230 perpendicular to the longitudinal direction, and an example of dimension 505 may be 9.75 mm. It is noted that the dimensions of strip 230 are not particularly limited to the aforementioned examples, and that strips of any suitable dimensions may be used.

Each strip 230 may be independently movable along the longitudinal axis of measurement assembly 100, irrespective of the movements of the other strips 230. When suspended evenly, each strip 230, held within strip slots 226a and 226b, may hang from clamp assembly 227 by its respective strip hanger 232. However, because strips 230 are held within outer strip slots 226a or inner strip slots 226b with minimal friction and may upward from this position in the longitudinal direction, as measurement assembly 100 is lowered down to a bottom surface of a borehole causing one or more strips 230 to contact the bottom surface, the one or more strip 230 may move longitudinally upward according to the contour of the bottom surface.

Figure 11:
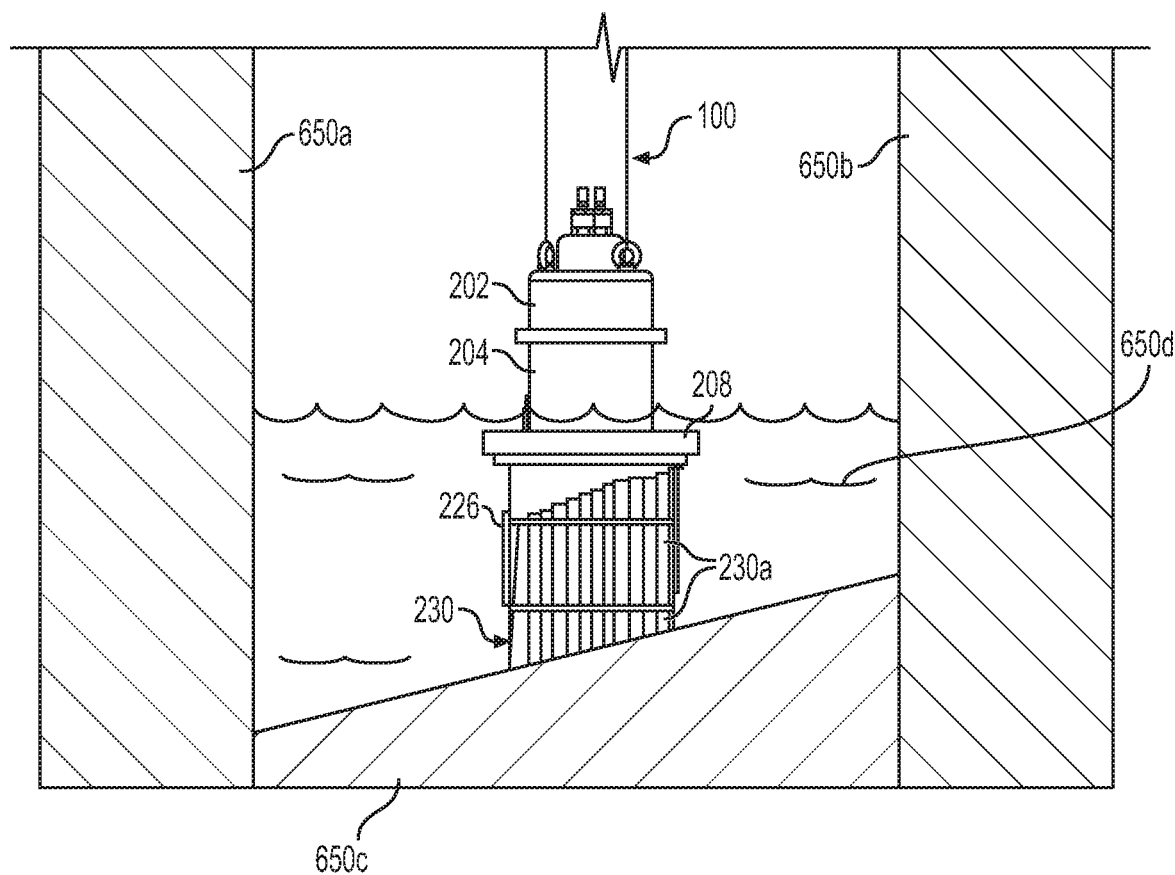
FIG. 11 is an illustration of the measurement assembly of FIG. 8A deployed in a borehole.

FIG. 11 illustrates an embodiment of measurement assembly 100 deployed in a borehole filled with mud and slurry 650d, and having an uneven bottom surface 650c. As can be seen, each of strips 230 is movable independently from one another, thereby forming a contour according to the uneven plane of bottom surface 650c of the borehole. This contour may stabilize measurement assembly 100 along the uneven bottom surface 650c and enable visualization of the bottom surface. The contouring may help provide a better seal against the bottom surface of the borehole for observation chamber 206 when the bottom surface of a borehole is uneven or sloped. Moreover, because outer strips 230a and inner strips 230b are arranged in a such manner to minimize any gaps formed between adjacent strips 230, as discussed above and illustrated in FIG. 8C, the seal formed from the contouring may be even more effective. With a better seal, measurement assembly 100 may effectively push out mud and slurry 650d trapped within strips 230 via fluid source 175, thereby enabling a clearer viewing of bottom surface 650c by camera 216 (not shown in FIG. 11).

Embodiments of the present disclosure may facilitate a borehole inspection process, and help avoid the need for deploying human inspectors into the boreholes. Measurements obtained by the present disclosure may help avoid parallax errors resulting from reading a scale at an angle.

The disclosure incorporates U.S. Pat. Nos. 7,187,784 and 8,169,477, and U.S. Patent Publication No. 2019/0120041 in their entireties by references.

When introducing elements of the present disclosure or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the disclosure are achieved and other advantageous results attained. As various changes could be made in the above constructions, products, and methods without departing from the scope of the disclosure, it is intended that all matter contained in the above description and shown in the accompanying drawings shall be interpreted as illustrative and not in a limiting sense.

We claim:

1. A borescope, comprising:
a housing;
an imaging assembly configured to visualize a field of view exterior of the housing; and
a plurality of movable strips extending away from the housing and surrounding the imaging assembly, wherein the plurality of movable strips is configured to allow the borescope to rest in an upright position when the borescope is placed on an inclined surface.

2. A borescope, comprising:
a housing;
an imaging assembly configured to visualize a field of view exterior of the housing; and
a plurality of strips extending away from the housing and surrounding the imaging assembly, wherein each of the plurality of strips is movable relative to the housing in a longitudinal direction.

3. The borescope of claim 2, wherein the plurality of strips includes a first plurality of strips arranged radially around the imaging assembly, and a second plurality of strips arranged radially around the first plurality of strips.

4. The borescope of claim 3, wherein each of the first plurality of strips is positioned radially inward of each of the second plurality of strips.

5. The borescope of claim 3, wherein the first plurality of strips circumferentially alternate with the second plurality of strips.

6. The borescope of claim 3, wherein each of the first plurality of strips is circumferentially spaced apart from an adjacent strip of the first plurality of strips by a first gap.

7. The borescope of claim 6, wherein one of the second plurality of strips is positioned directly radially outward of each first gap.

8. The borescope of claim 7, wherein each of the second plurality of strips is circumferentially spaced apart from an adjacent strip of the second plurality of strips by a second gap.

9. The borescope of claim 8, wherein one of the first plurality of strips is positioned directly radially inward of each second gap.

10. The borescope of claim 2, wherein each of the plurality of strips is independently movable relative to any other of the plurality of strips.

11. The borescope of claim 2, further including a support assembly comprising a flange having a plurality of slots disposed through the flange, wherein each of the plurality of strips is received by one of the slots.

12. The borescope of claim 11, wherein each of the plurality of strips includes a flange configured to abut the flange of the support assembly, wherein each flange of the plurality of strips is disposed between the housing and the flange of the support assembly.

13. A borescope, comprising:
a housing, wherein the housing includes a viewing window and a pressurized barrier, wherein the pressurized barrier surrounds at least a portion of a periphery of the viewing window; and
at least one imaging assembly configured to visualize a field of view exterior of the housing through the viewing window.

14. The borescope of claim 13, wherein the barrier is a tubing, and the tubing is configured to press against a surface to form a seal between the surface and the window.

15. The borescope of claim 13, further including an extendable and retractable support assembly coupled to the housing on a side opposite of the viewing window.

16. The borescope of claim 15, wherein the support assembly includes telescoping rod sections that are movable relative to one another, to adjust a length of the support assembly.

17. The borescope of claim 16, further including a linear actuator configured to move the telescoping rod sections relative to one another.

18. The borescope of claim 15, further including a sensor coupled to the support assembly, wherein the sensor is configured to measure a current directed to the support assembly, and a controller coupled to the sensor and the support assembly, wherein the controller is configured to increase a length of the support assembly until the controller receives an indication of a spike in current from the current sensor.

19. The borescope of claim 18, wherein the controller is configured to stop a flow of current to the support assembly upon receiving the indication of the spike.

20. The borescope of claim 19, wherein the spike occurs when a load on the support assembly reaches a threshold that is greater than 80% of the load rating of the support assembly.

* * * * *